US012249457B2

(12) United States Patent
Ryland et al.

(10) Patent No.: US 12,249,457 B2
(45) Date of Patent: Mar. 11, 2025

(54) SYSTEM AND METHOD FOR GENERATING A CONTROLLED MAGNETIC FLUX

(71) Applicant: BUILD BEYOND, LLC, Davis, CA (US)

(72) Inventors: Graham Ryland, West Sacramento, CA (US); John Shepard, Davis, CA (US)

(73) Assignee: BUILD BEYOND, LLC, Davis, CA (US)

( * ) Notice: Subject to any disclaimer, the term of this patent is extended or adjusted under 35 U.S.C. 154(b) by 0 days.

(21) Appl. No.: 18/413,614

(22) Filed: Jan. 16, 2024

(65) Prior Publication Data

US 2024/0203629 A1 Jun. 20, 2024

Related U.S. Application Data

(63) Continuation of application No. PCT/US2022/053963, filed on Dec. 23, 2022.

(60) Provisional application No. 63/293,736, filed on Dec. 24, 2021.

(51) Int. Cl.
*H01F 7/20* (2006.01)

(52) U.S. Cl.
CPC .................................... *H01F 7/206* (2013.01)

(58) Field of Classification Search
CPC ......... H01F 7/206; B22D 23/00; B22D 35/00; B22D 39/003; H05B 6/06; H05B 6/32; H05B 6/40; H05B 6/44
See application file for complete search history.

(56) References Cited

U.S. PATENT DOCUMENTS 4,795,872 A * 1/1989 Hagisawa ................ C21D 9/60 219/645
2009/0101636 A1 4/2009 Lovens et al.
2013/0135067 A1* 5/2013 Choi ....................... H01F 7/206 335/290
2019/0366427 A1 12/2019 Franz et al.
2021/0245241 A1 8/2021 Spitans et al.
2021/0251054 A1 8/2021 Spitans et al.
2021/0251055 A1 8/2021 Spitans et al.

FOREIGN PATENT DOCUMENTS

WO 2023122336 A1 6/2023

* cited by examiner

*Primary Examiner* — Mohamad A Musleh
(74) *Attorney, Agent, or Firm* — Peacock Law P.C.; Deborah A. Peacock; Marco H. Santamaria

(57) ABSTRACT

A system and method for manipulating or heating conductive material. The system comprises: a first electromagnet; a second electromagnet; the first electromagnet and the second electromagnet each comprising: a body; a first pole, the first pole proximal to a working surface; a second pole, the second pole distal to a working surface; a coil at least partially disposed around the body; a modulating controller configured to selectively apply a current to the first or the second electromagnet; the current configured to produce a time-varying flux density at the first pole; and a working volume in communication with the first pole. Manipulation of the material may be contactless and may include, but is not limited to, rotating, levitating, moving, and/or shaping the conductive material.

11 Claims, 22 Drawing Sheets

SYSTEM AND METHOD FOR GENERATING A CONTROLLED MAGNETIC FLUX

CROSS-REFERENCE TO RELATED APPLICATIONS

This application is a continuation of PCT/US2022/053963, entitled "SYSTEM AND METHOD FOR GENERATING A CONTROLLED MAGNETIC FLUX", filed on Dec. 23, 2022, which claims priority to and the benefit of the filing of U.S. Provisional Patent Application No. 63/293,736, entitled "SYSTEM AND METHOD FOR GENERATING CONTROLLED MAGNETIC FLUX DENSITY FOR MANUFACTURING", filed on Dec. 24, 2021, and the specification and claims thereof are incorporated herein by reference.

STATEMENT REGARDING FEDERALLY SPONSORED RESEARCH OR DEVELOPMENT

This invention was made with government support under Contract No. 80NSSC21C0164 awarded by NASA Shared Services Center. The government has certain rights in the invention.

BACKGROUND OF THE INVENTION

Field of the Invention (Technical Field)

The present invention relates to a system and method utilizing electromagnets to generate a magnetic field useful for manufacturing. More specifically, the present invention relates to programmatically controlled and coordinated drive electromagnets to generate a field having dynamic magnetic flux densities.

Description of Related Art

Note that the following discussion may refer to a number of publications by author(s) and year of publication, and that due to recent publication dates certain publications are not to be considered as prior art vis-a-vis the present invention. Discussion of such publications herein is given for more complete background and is not to be construed as an admission that such publications are prior art for patentability determination purposes.

Electromagnets are used extensively in a wide variety of manufacturing processes today, such as sorting, fixturing, and heating. Ferrous materials, including iron, are attracted to a magnetic field generated by an electromagnet, but nonferrous materials including, but not limited to, aluminum, do not respond to a constant magnetic field. However, if the current input to the electromagnet is rapidly switched from positive to negative, this causes the magnetic field to generate a force in nonferrous materials. When the polarity of the electromagnet is rapidly flipped, this generates a varying magnetic flux density which induces a current in the target material, which in turn creates a magnetic field in the target material which generates corresponding forces. These electromagnetic forces are used in the sorting process for aluminum and steel in the recycling industry. For example, when sinusoidal current is input to an electromagnet under a conveyor belt, steel is attracted to the belt while aluminum is repelled. The repulsive force generated in this application has a basic directionality based on the coil configuration, but is unstable, exerting no keeping forces on the target material. The amount of repulsive force can be changed by increasing or decreasing the amplitude of the sinusoidal current input, but there is little reprogrammability or control in simple applications like this.

Foundries use induction to heat metals for melting and heat treatment. Typically, harmonic circuits draw from a constant power source to generate a sinusoidal current output to drive an induction coil. A significant advantage to using this type of electric circuit is that it is able to achieve a high frequency of sinusoidal power output at a high amperage efficiently. Although these off-the-shelf induction heaters are powerful, there is no option to coordinate with other coils since the power output is so dependent on the basic electric circuit. Sinusoidal amplitude output can be increased and decreased by adjusting the constant amperage and/or voltage input, but that is the limit to adjustability for such devices.

Inductive heating is a well-established technology, widely used for induction furnaces, forging, forming, and heat treating. Alternating currents in a wire coil create a time-varying magnetic field which induces eddy currents in conductive material. The internal resistance of the material generates heat, which will eventually cause it to melt. Inductive heating allows precise temperature control, with overall power dissipation approximately:

$$P = \frac{\pi^2 B_p^2 d^2 f^2}{6k\rho D}, \tag{1}$$

where P is power lost per unit mass [W/kg], Bp is peak magnetic field [Tesla], d is thickness of the material [meter], f is frequency [Hz], k=shape factor, ρ is resistivity of the material [Ω·m] and D is material density [kg/m$^3$].

For focused heating like melting surface layers, high frequency skin effects can control the depth of heating:

$$\delta = \frac{1}{\sqrt{\pi f \mu \sigma}}, \tag{2}$$

Where δ is the penetration depth [m], f is the frequency [Hz], μ is the magnetic permeability of the material [H/m], and σ is the electrical conductivity of the material [S/m].

Lorentz forces are also a well-established phenomenon and the basis for numerous technologies, such as linear induction motors, maglev trains, and eddy current dampers. A changing magnetic field induces eddy currents in a conductor, which exerts electromagnetic or Lorentz force opposing the changing magnetic field. As an example, moving a permanent magnet near a nonferrous conductor imparts a drag force opposing the direction of motion. Most engineering applications move magnets along the major surface of the material to dissipate energy, however the same effect occurs moving into or away from the surface to push or pull the material normal to its surface. As an idealized example, the force on a wire is:

$$F = I\ell \times B \tag{3}$$

where F is the force vector, t is a vector representing the wire with current I, and B is the magnetic field vector. For a coil of wire, the idealized magnetic field along the axis of the coil is:

$$\vec{B} = \frac{\mu_0 \mu \hat{j}}{2\pi(y^2 + R^2)^{3/2}}. \quad (4)$$

Where μ is magnetic dipole moment, j is the unit vector along the coil axis, y is the distance from the coil center and R is the radius of the coil. Because of the cross product and the magnetic field decreasing with distance cubed, the proposed system has greatest control at short distances moving along the surfaces of the arrays.

Induction motors generate a flux density near a conductive material which induces a current in the conductive material and generates a corresponding force, rotating the motor. Many induction motors are three-phase and use the rotational position of the rotor to coordinate power to coils in a specific pattern to generate greatest torque. Similarly, linear induction motors used in manufacturing and applications like maglev trains coordinate coil power based on the position of the armature. These electromagnets induce enough force that the armature levitates for applications that require low friction. Some linear motors use phase modulation to programmatically control the position of the armature along the length of the linear motor and amplitude modulation to control the distance repelled from the track. Induction linear motors are the most similar to our novel innovation but lack core features and strategies necessary to exert keeping forces and position control over generic target objects which are not specifically designed as an armature. Linear motor coils are physically shaped to exert force on the armature in one axis of motion but have no ability to control the other two axes of motion or programmatically control the three axes of rotation of the target object. Typically, linear induction motors use horseshoe permanent magnets as a core for their electromagnets that bring both poles to the surface to act on a defined armature, as such the poles are not independently controllable.

The automotive industry uses high-speed, high-power, high efficiency electrical components to create programmatically controlled magnetic fields powerful enough to generate flux density necessary to control, levitate, and melt target materials. For example, the certain electromagnets can deliver 35 amps with pulse wide modulation control up to 20 KHz.

Linear induction motors (LIM) use a three phase AC current to generate forces on solid conductive material without melting. There are inductive heaters that are designed to heat metals to melting and some can even levitate the conductive metal in air. There are applications where electromagnets precisely move ferrofluids to make shapes and perform useful activities like show the time as a consumer product or aggressively mix liquids in chemistry applications.

However, linear induction motors are only capable of manipulating solid objects and lack the programmability and coil complexity to form stable electromagnetic equilibria for molten metal. Additionally, some inductive heaters are capable of forming a stable electromagnetic equilibrium for molten metal, but their electromagnets are not programmable and cannot change the magnetic field shape without mechanically changing they coil configuration. Ferrofluids can be shaped and moved using an array of electromagnet coils, but the material itself is attracted and not repelled as is required for non-ferrous aerospace materials like aluminum, which is the core application of our manufacturing process.

Previous work includes an electromagnetic device for pumping liquid metal through a channel using a "traveling wave magnetic field" which is referred to herein as "Phase Modulation" for pumping liquid metal, but this system is not touchless and is not reconfigurable, where coils are wound around the "channel" as opposed to be arrayed around the liquid to define the working space.

Previous work also includes an electromagnetic device for ejecting liquid metal from a nozzle in an additive manufacturing process. Again, coils are arranged around a chamber of liquid metal and used to push liquid metal out of a nozzle.

Previous work includes using electromagnetic coils wrapped around a chamber of liquid metal to eject liquid metal onto a flat surface as an additive manufacturing process. Other work includes an electromagnetic device that uses an electromagnetic coil array to create plasma to sputter a target material for adding a coating. Previous work also includes a system that uses a combination of permanent magnets and a plurality of electromagnets to generate a stable levitating force. What is needed is a system to generate a field having dynamic magnetic flux densities useful for touchless transporting, heating, melting, and shaping of conductive materials.

BRIEF SUMMARY OF THE INVENTION

The present invention relates to a system for manipulating or heating conductive material, the system comprising: a first electromagnet; a second electromagnet; the first electromagnet and the second electromagnet each comprising: a body; a first pole, the first pole proximal to a working surface; a second pole, the second pole distal to a working surface; a coil at least partially disposed around the body; a modulating controller configured to selectively apply a current to the first or the second electromagnet; the current configured to produce a time-varying flux density at the first pole; and a working volume in communication with the first pole. In another embodiment, the system further comprises a third electromagnet at least partially disposed beside a first face of the first or the second electromagnet. In another embodiment, the system further comprises a fourth electromagnet at least partially disposed beside a second face of the first or the second electromagnet. In another embodiment, the system further comprises a fifth electromagnet at least partially disposed beside a third face of the first or the second electromagnet. In another embodiment, the system further comprises a sixth electromagnet at least partially disposed beside a fourth face of the first or the second electromagnet.

In another embodiment, the system further comprises a first plurality of electromagnets arranged in parallel. In another embodiment, the system further comprises an array of electromagnets. In another embodiment, the system further comprises a second plurality of electromagnets disposed radially along a center axis. In another embodiment, the second plurality of electromagnets form a channel comprising the working volume. In another embodiment, the system further comprises a plurality of rows of the second plurality of electromagnets.

In another embodiment, the working surface is planar. In another embodiment, the working surface is curved. In another embodiment, the flux density is configured to dispose a target at least partially within the working volume. In another embodiment, the flux density is affected by the first electromagnet and the second electromagnet. In another embodiment, the flux density is at least partially disposed between the first electromagnet and the second electromagnet. In another embodiment, the system further comprises a sensor in communication with said modulating controller.

The present invention also relates to a method for manipulating or heating conductive material, the method comprising: providing a system for manipulating or heating conductive material, the system comprising: a first electromagnet; a second electromagnet; the first electromagnet and the second electromagnet each comprising: a body; a first pole, wherein the first pole is proximal to a working surface; a second pole, wherein the second pole is distal to the working surface; a coil at least partially disposed around the body; a modulating controller, wherein the modulating controller selectively applies a current to the first or second electromagnet; the current producing a time-varying flux density at the first pole; and a working volume in communication with the first pole; at least partially disposing a conductive material into the working volume; and applying the time-varying flux density to the conductive material; and manipulating the conductive material. In another embodiment, the working volume is a channel. In another embodiment, the method further comprises rotating the conductive material. In another embodiment, the method further comprises moving the conductive material from an initial position. In another embodiment, the method further comprises heating the conductive material.

Further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more embodiments of the invention and are not to be construed as limiting the invention. In the drawings.

DETAILED DESCRIPTION OF THE INVENTION

Figure 1:
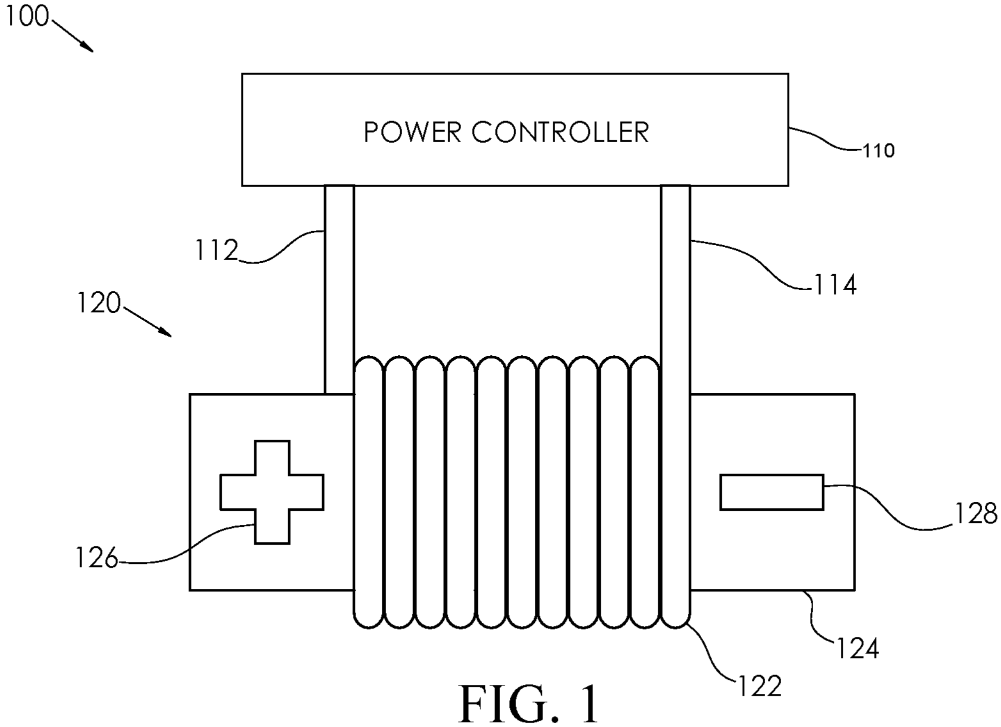
FIG. 1 is a diagram showing one electromagnet and controller.

The present invention relates to a system comprising electromagnets to generate a magnetic field for manufacturing. More specifically, the present invention relates to a programmatically controlled and coordinated drive for one or more electromagnets. The electromagnets may generate a field having dynamic magnetic flux densities to achieve touchless transporting, heating, melting, and shaping of a conductive material.

The system may comprise a high-speed, high-power electrical switch, a programmatic control drive, and a flux former comprising an electromagnet and/or electromagnetic coil. The flux former may also comprise a plurality of electromagnets and/or electromagnetic coils. The system may produce a dynamic magnetic field. The dynamic magnetic field may produce a controlled flux density distribution. The controlled flux density may manipulate and/or heat a target material without mechanical contact. The manipulation may include, but is not limited to, levitation, transport, confinement, and forming of materials into a desired physical shape and/or profile.

As used herein, a "surface" is defined in the specification, drawings, and claims as a subset of a mathematical surface, is always finite, exists in three-dimensional space, and has two faces having opposite normals at every point of the surface.

As used herein, the term "working volume" is defined in the specification, drawings, and claims as a three-dimensional volume in free space in which a programmatically defined flux density may be provided by the electromagnets for the manipulation and heating of material. The electromagnets of the present invention are disposed entirely outside of the working volume and produce the programmatically defined flux density that reaches into the working volume. A working volume may be subject to other influences, too, e.g., acceleration (including gravitational acceleration), convection, thermal radiation, etc. The working volume may be any shape and/or dimension including, but not limited to, a trough, a channel, a sphere, a cylinder, a cube, a polygon, or a combination thereof.

As used herein, the term "target" and/or "target material" is defined in the specification, drawings, and claims as a compound, mixture, or substance comprising a metal atom. The term "metal" or "metals" includes, but is not limited to, metal hydroxides, metal oxides, metal salts, elemental metals, metal ions, non-ionic metals, minerals, or a combination thereof.

The target may comprise, but is not limited to, neodymium ("Nd"), praseodymium ("Pr"), dysprosium ("Dy), copper ("Cu"), lithium ("Li"), sodium ("Na"), magnesium ("Mg"), potassium (K"), calcium ("Ca"), titanium ("Ti"), vanadium ("V"), chromium ("Cr"), manganese ("Mn"), iron ("Fe"), cobalt ("Co"), nickel ("Ni"), cadmium ("Cd"), zinc ("Zn"), aluminum ("Al"), silicon ("Si"), silver ("Ag"), tin ("Sn"), platinum ("Pt"), gold ("Au"), bismuth ("Bi"), lanthanum ("La"), europium ("Eu"), gallium ("Ga"), scandium ("Sc"), strontium ("Sr"), yttrium ("Y"), zirconium ("Zr"), niobium ("Nb"), molybdenum ("Mo"), ruthenium ("Ru"), rhodium ("Rh"), palladium ("Pd"), indium ("In"), hafnium ("Hf"), tantalum ("Ta"), tungsten ("W'), rhenium ("Re"), osmium ("Os"), iridium (Ir"), mercury ("Hg"), lead ("Pb"), polonium ("Po"), cerium ("Ce"), samarium ("Sm"), erbium ("Er"), ytterbium ("Yb"), thorium ("Th"), uranium ("U"), plutonium ("Pu"), terbium ("Tb"), promethium ("Pm"), tellurium ("Te"), or a combination thereof.

As used herein, the term "flux density" is defined in the specification, drawings, and claims as the amount of magnetic flux in an area taken perpendicular to the magnetic flux's direction. The Système International d'Unités (SI) unit of flux density is the Tesla (T).

As used herein, the term "drive density" is defined in the specification, drawings, and claims as the time-varying power output from a controller.

As used herein, the term "time-varying power density" is defined in the specification, drawings, and claims as a current or voltage that resembles a sine wave, square wave, triangular wave, and combinations thereof which may include positive or negative biases.

As used herein, the term "stable equilibrium" is defined in the specification, drawings, and claims as volumes of space where electromagnetic forces on conductive materials balance and result in little to no motion. System equilibria may be categorized as either "stable" which attract and "unstable" which repel. Stable equilibria are analogous to a valley, where a ball will roll back to the bottom of the valley if disturbed. Unstable equilibria are analogous to a hilltop, where a ball can balance on top but will roll away if disturbed.

As used herein, the term "pose control" is defined in the specification, drawings, and claims as the ability of a system to control all geometric degrees of freedom of the target material including translation and rotation as well as derivatives thereof, such as velocity and acceleration.

As used herein, the term "flux pocket" is defined in the specification, drawings, and claims as a region of stability in the electromagnetic field, where small spatial deviations beyond this region result in forces and torques restoring an object to this region.

As used herein, the term "amplitude modulation" is defined in the specification, drawings, and claims as increasing or decreasing the amplitude of the time-varying power input to a plurality of electromagnetic coils to programmatically generate regions of high flux density.

As used herein, the term "phase modulation" is defined in the specification, drawings, and claims as coordinating the power amplitude peak time of multiple coils and correspondingly the peak time of magnetic flux density. This may also be referred to as "commutation", "magnetic river", or "traveling wave magnetic field". Phase modulation generates a force in the direction of the modulation.

As used herein, the term "frequency modulation" is defined in the specification, drawings, and claims as increasing or decreasing frequency of amperage to the electromagnet which results in an increase or decrease in the rate of change of the corresponding flux density. Frequency modulation allows for the independent control of heat input to the target and force exerted on the target.

The system may comprise an array of independently-controlled induction coils that create a magnetic flux density to move, melt, and reshape a target material including, but not limited to, an aerospace metal. The system may recycle standard aerospace metals in space. The array of independently controlled induction coils may create an arbitrary eddy current and a Lorentz force to move, melt, and shape metal, e.g., "free-cast" a target material. This present invention may be an inductive foundry and may have applications including but not limited to: recycling, material handling, docking, welding, large-scale additive manufacturing, metal coating, and formation of large scale structures.

The system may use an array of programmable electromagnets to form arbitrary magnetic equilibria that can transport, hold, heat, melt, and form conductive materials like aluminum. The system may be touchless and have no moving parts, but may be adaptable. Identical or similar system components may be used to heat a target material to different temperatures or manipulate a target material into different physical profiles or positions with software updates alone.

The system may be programmed and/or configured to produce an unlimited number of manufactured shapes from a target material without reconfiguring the components of the system. The system may require less maintenance compared to other metal processing systems because it is touchless and has no moving parts.

The system may comprise a working volume diameter. Smaller diameters (10-20 mm) may increase efficiency, and may be able to concentrate power on less material and lose less material from radiative heat transfer. The working volume diameter may be at least about 5 mm, about 5 mm to about 25 mm, about 10 mm to about 20 mm, or about 25 mm. A small working volume diameter (e.g., <25) may concentrate energy and limit losses. A smaller diameter may also enable greater recycling throughput than larger diameters. The system may comprise and/or operate at a higher voltage and lower current to have greater efficiency and throughput. The system may achieve around at least about 5%, about 5% to about 25%, about 10% to about 20%, or about 25% electrical-to-thermal power efficiency. The system may achieve a recycling throughput of at least about 0.5 kg/hr, about 0.5 kg/hr to about 5.0 kg/hr, about 1.0 kg/hr to about 4.5 kg/hr, about 1.5 kg/hr to about 4.0 kg/hr, about 2.0 kg/hr to about 3.5 kg/hr, about 2.5 kg/hr toa bout 3.0 kg/hr, or about 5.0 kg/hr.

The present invention has applications in two distinct environments, i.e., terrestrial applications and space applications. There are many applications on earth where precise programmatic control of electromagnetic fields can be used for improved physical control of conductive materials and heat generated in those materials. For example, this technology can improve E-waste material separation, where programmatically tailored forces can be generated for each target to separate waste streams at a more fine granularity than is possible with today's technologies. There are many applications in recycling and beneficiation for next generation precious metals, including but not limited to lithium, rare earth metals including but not limited to neodymium, precious metals including but not limited to silver and gold, as well as base metals including but not limited to nickel, copper, and cobalt, as well as any other valuable materials that are conductive. By offering more precise and capable recycling processes the need for conflict materials such as tin and tungsten are reduced. The present invention also has applications in metal processing such as aggressive mixing of molten alloys, dross and slag reclamation, molten metal pumping and transportation, as well as shielding of sensitive components such as electrodes or sensors. The present invention can also be used on earth for crack repair and joining. By heating a crack until wetted and using inductive forces to aggressively mix the wetted area it is possible to reform and heal the material. By following a precise thermal profile when cooling, it is possible to then return the material to similar material properties of strength and ductility. Applications for this include railroad crack repair, crack repair of aerospace applications including but not limited to airplanes and reusable rockets, boat hull repair, as well as affixing or repairing aluminum components for food stuffs, which are typically made from difficult to weld alloys and demand a very high level of cleanliness.

Using the present invention in a space environment has many advantages and applications as a recycling and additive manufacturing process. The majority of man-made objects in low earth orbit are made from conductive materials, so the present invention can be used for on-orbit soft docking that is touchless, has no moving parts, and can generate programmatically controlled forces on non-standard geometries objects in zero gravity. In the same way, the present invention can also be used as a material intake for asteroid and lunar mining. Material mass is more easily suspended in a low gravity environment which greatly reduces the power required to move and form materials. Using the invention in a vacuum mitigates conductive and convective heat losses while also maintaining material purity by reducing oxidation, opening the door to new materials and alloys. As the cislunar economy grows, closed-loop recycling processes are key to turning end-of-life materials into something useful. The system of the present invention can generate numerous forms of basic feedstocks for processes including but not limited to welding. Additionally, the present invention can be used as a metal additive manufacturing process where metal is transported, heated to melting, formed, and allowed to cool into more complex part shapes that are useful for construction, including but not limited to rods, spars, scaffolding, and various other structural elements. This manufacturing process of the present invention has a potentially unlimited build volume in space, where conductive metal goes in one side and useful cross-sectional structures are extruded out the other side. In this way, structures that would be impossible to launch into orbit because of their shape and scale can now be made in space from materials that would typically be burned up in the atmosphere. This manufacturing process is the ideal tool for in-space recycling and manufacturing. Finally, the present invention can be used in space as a combined "vacuum cleaner" and "cutting torch" using electromagnetic induction for safely collecting debris at small and large scales as the cornerstone of debris remediation services. For small-scale debris, the system draws in particles and chips generated during cutting, drilling or other manufacturing operations. This is analogous to using a vacuum cleaner alongside a drill to suck up debris as it is created. For large-scale debris, this system melts a targeted area of a satellite or rocket body, draws in the molten material, and traverses to the next area. This is analogous to a cutting torch. This multipurpose system can serve as a small satellite payload, robot end effector, or as a handheld or mountable tool for astronauts. Other applications include but are not limited to induction brazing or welding, and plugging holes from debris impact. The system of the present invention addresses the growing problem and opportunity of active debris remediation and in-space assembly and manufacturing.

Turning now to the figures, FIG. 1 shows one electromagnet and controller. As illustrated in FIG. 1, flux control module 100 comprises an electromagnet 120 driven by power controller 110 that may programmatically power the coil 122 which is disposed around a body 124. Body 124 comprises a material having high magnetic permeability. Electromagnet 120 generates a magnetic dipole through body 124 when current is provided by power controller 110 to coil 122. The orientation of this dipole is denoted by positive charge 126 for the positive pole and by negative charge 128 for the negative pole. The orientation relates to the direction of the magnetic flux when a positive current flows from power controller 110 into coil 122 through positive lead 112 and returns to power controller through negative lead 114. For a time-varying current, such as an alternating circuit, the magnetic dipole also changes with time and maintains a consistent phase relationship to the current.

The + and −notation, as exemplified by positive charge 126 and negative charge 128 in FIG. 1 but used herein throughout, represents a momentary status of the dipoles through the respective coil 122 and body 124 as controller 110 drives a positive current into coil 122 through lead 112. The + and −notation indicate a relative timing or phase relationship between the poles and any depictions are representative of a specific snapshot in time.

Figure 2:
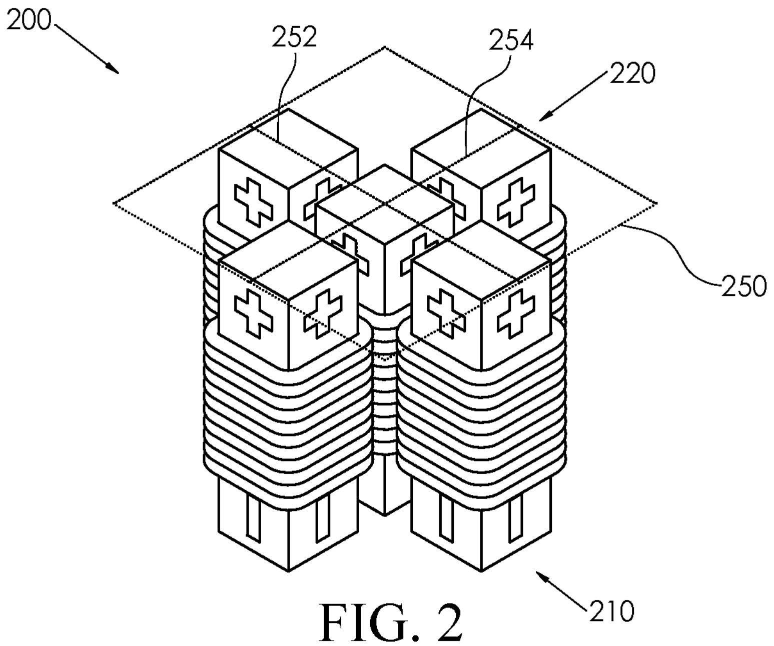
FIG. 2 is a diagram showing an array of five electromagnets distributed about a flat surface.

FIG. 2 shows an array of five electromagnets 200 distributed about a flat surface. Five electromagnets are arrayed against working surface 250, which is planar. Three electromagnets are aligned to form column 210, which is parallel to axis 252 of working surface 250. Three electromagnets align to form row 220 which is parallel to axis 254. The electromagnets each have a pole contacting surface 250 on the magnet face of the surface. Such a distribution of electromagnets allows control over a target (not shown) in a working volume disposed on the working face side the surface, i.e., the side opposite the magnet face. Not shown is the controller which is configured to independently drive each of the electromagnets but is able to modulate magnetic flux on the working face side of surface 250 to manipulate conductive materials located there. Array of five electromagnets 200 generates a flux pocket which creates a stable equilibrium for the target material by coordinating the time-varying power to each of the five electromagnets.

Figure 3:
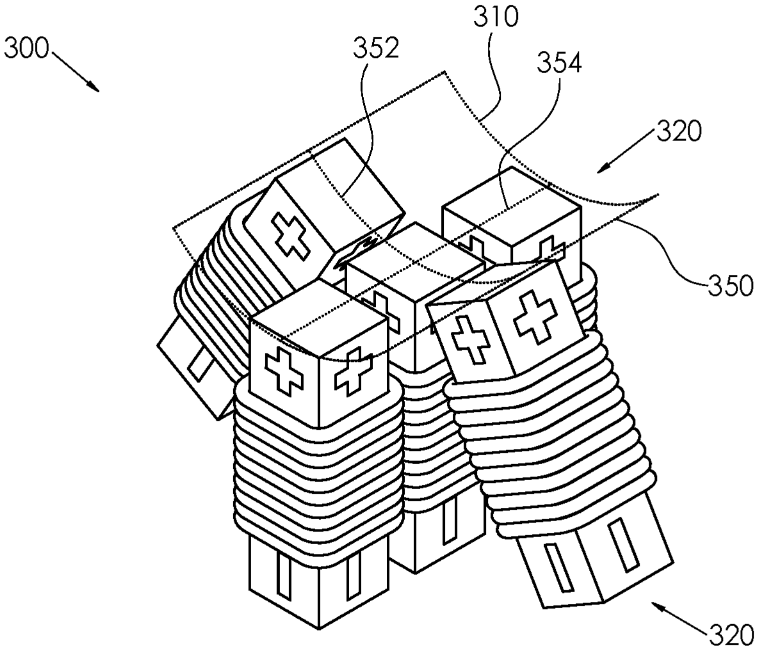
FIG. 3 is a diagram showing an array of five electromagnets distributed about one side of a curved surface.

FIG. 3 shows an array of five electromagnets 300 disposed around one side of curved working surface 350. Array of five electromagnets 300 comprises five electromagnets distributed about the magnet face side of curved working surface 350 comprising straight longitudinal axis 354 and orthogonal azimuthal axis 352. Each electromagnet comprises a pole meeting curved working surface 350 from the magnet face. Three magnets forming row 320 are disposed parallel to surface axis 354. The magnets forming arc 310 are disposed parallel to surface axis 352. A controller (not shown) is configured to independently drive each of the electromagnets and is able to modulate magnetic flux on the working face side of the surface 350 to manipulate conductive materials located there.

Figure 4:
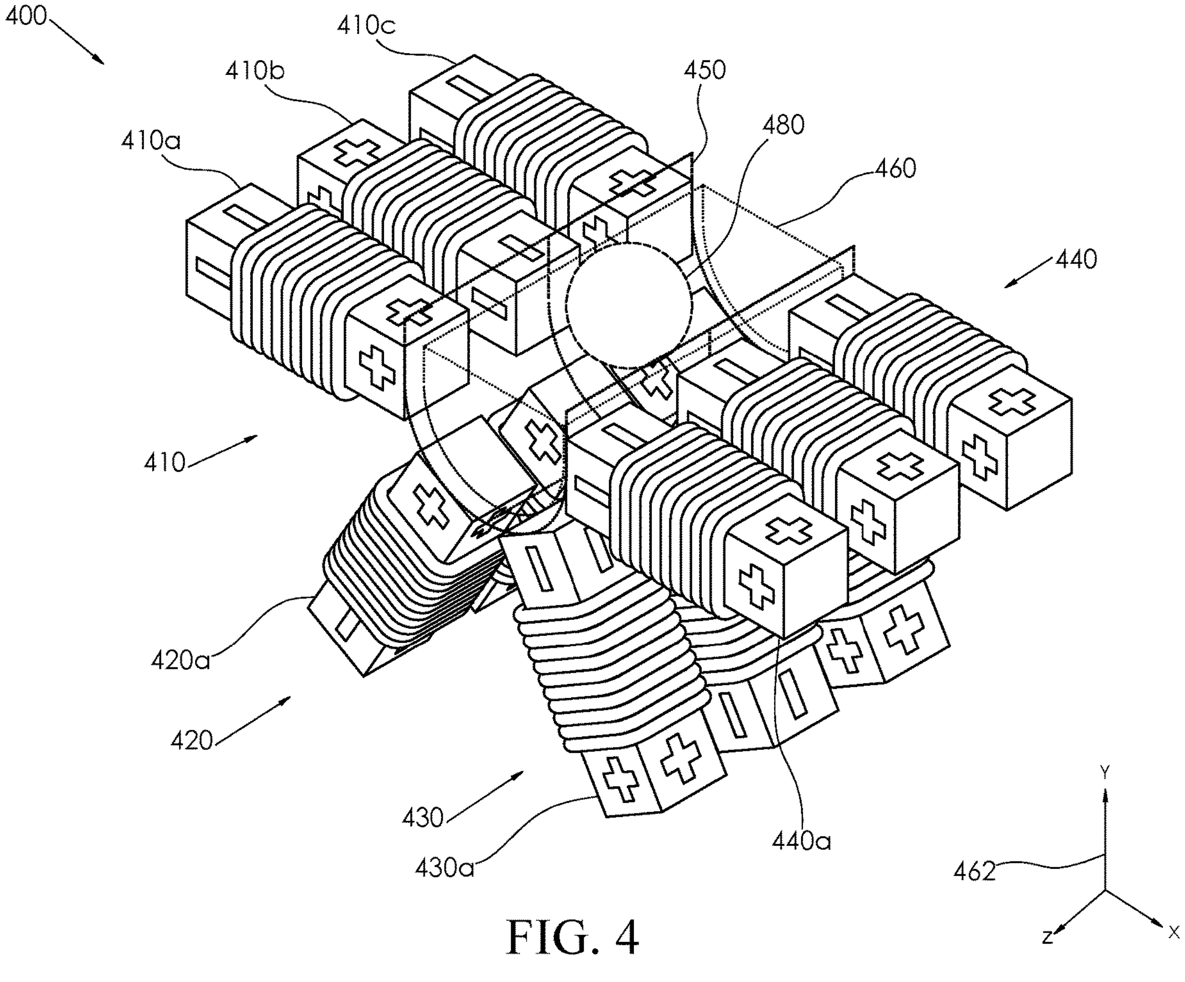
FIG. 4 is a diagram showing an embodiment of a flux former comprising an array of electromagnets, configured for touchless manipulation of a target material by amplitude modulation.

FIG. 4 shows flux former 400 comprising an array of electromagnets, configured for touchless manipulation of a target material by amplitude modulation. Flux former 400 is oriented according to three-dimensional Cartesian coordinate system 462. Flux former 400 comprises an array of electromagnets configured for touchless manipulation of a target material by amplitude modulation. Flux former 400 shown comprises twelve electromagnets distributed about a trough-shaped surface 450 on the magnet face side of the surface. The electromagnets are arranged in four rows 410, 420, 430, and 440 each comprising three magnets (e.g., 410*a*, 410*b*, and 410*c*), each electromagnet being independently connected to a controller (not shown) which selectably supplies a modulated current to each electromagnet. Channel 460 exists on the working face side of surface 450 and represents the region selected for usable manipulation of target 480.

Flux former 400 may operate in a terrestrial environment wherein gravitational force acts on target 480 in a negative Y axis, downward direction that is countered by forces induced by the functioning of flux former 400. Thus, the gravitational force pulls target 480 toward the bottom of surface 450. This gravitational bias is an asymmetry that explains the asymmetrical form (i.e., having an open top) of this embodiment of the invention.

Channel (e.g., working volume) 460 is prescribed to be on the working side of surface 450, but some of a working volume's extents are not dependent (or not solely dependent) on the shape of the surface.

The trough of surface 450 may have no top, but channel 460 is bounded. One basis for limiting the extent of a working volume is to ensure, by design, that the system of a particular embodiment is able to exert adequate control over a target. In this case, "adequate control" is being able to induce adequate force in an appropriate direction so as to enable manipulation of the target with whatever level of performance is specified as being required.

While surface 450, from the working side, represents a maximum allowed extent for channel 460, flux former 400 shows that channel 460 is inset from surface 450.

The appropriate inset, which may comprise a physical barrier of channel 460 from a surface 450) may depend on specific conditions and may change overtime. For example, while target 480 is solid, the inset may be determined to be zero, since there may be no reason to prevent contact between target 480 and the components of flux former 400. The inset may be non-zero, i.e. have a defined physical width, to prevent target 480 exiting channel 460 and contacting the components of flux former 400. A non-zero inset may be provided to prevent contact in the event of loss of power in flux former 400. These components include, but are not limited to, a pole of an electromagnet; a structure that may support the electromagnets; a containment wall that physically isolates the electromagnets; and/or associated circuitry. If target 480 comprises molten metal, contact with an electromagnet pole or other physical structure may cause damage, including melting, scarring (e.g., pitting), thermal stresses. Additionally molten material may solidify on the surface of flux former 400, which may cause a buildup a target 480 material and necessitate cleaning or repair. Flux former 400 may be configured to prevent target 480 from contacting flux former 400 components while being manipulated and/or heated.

Additional factors may influence the dimensions of a working volume. For example, if the environment is subject to vibration, or modulations in power, the amplitude of such variations and the effect they have on the performance of the flux former 400 may be adjusted. The ability to tune controller and the electromagnets may provide margin for error or a safety margin, thus providing confidence that a target will remain under control in all expected circumstances.

Properties of target 480 or its constituent material(s) may affect the dimensions of a working volume. For example, the viscosity of a material may depend on temperature. Similarly, the surface tension of a liquid material may depend on temperature. A highly viscous material may behave significantly like a solid, but materials having a low viscosity, or a low surface tension, may be more difficult to control finely and can thus warrant a tighter working volume (e.g., one where the inset from the working surface is increased).

While a working volume such as channel 460 may remain fixed to encompass a minimum volume that is usable under all expected conditions, the working volume may also be dynamically determined, e.g., becoming smaller (as would be the case with an increased inset from the surface 450) as a target melts into a liquid form, or larger (a decreased inset) as a target becomes solid (i.e., solidifies).

The criteria for determining an appropriate working volume are by way of example and not limitation. Many parameters that will become apparent to those skilled in the art that may influence the optimal and/or desires dimensions working volume including, but not limited to, frequency of cleaning and/or maintenance; tolerance system reliability, operating parameters including, but not limited to, speed of operation; or a combination thereof.

Figure 5:
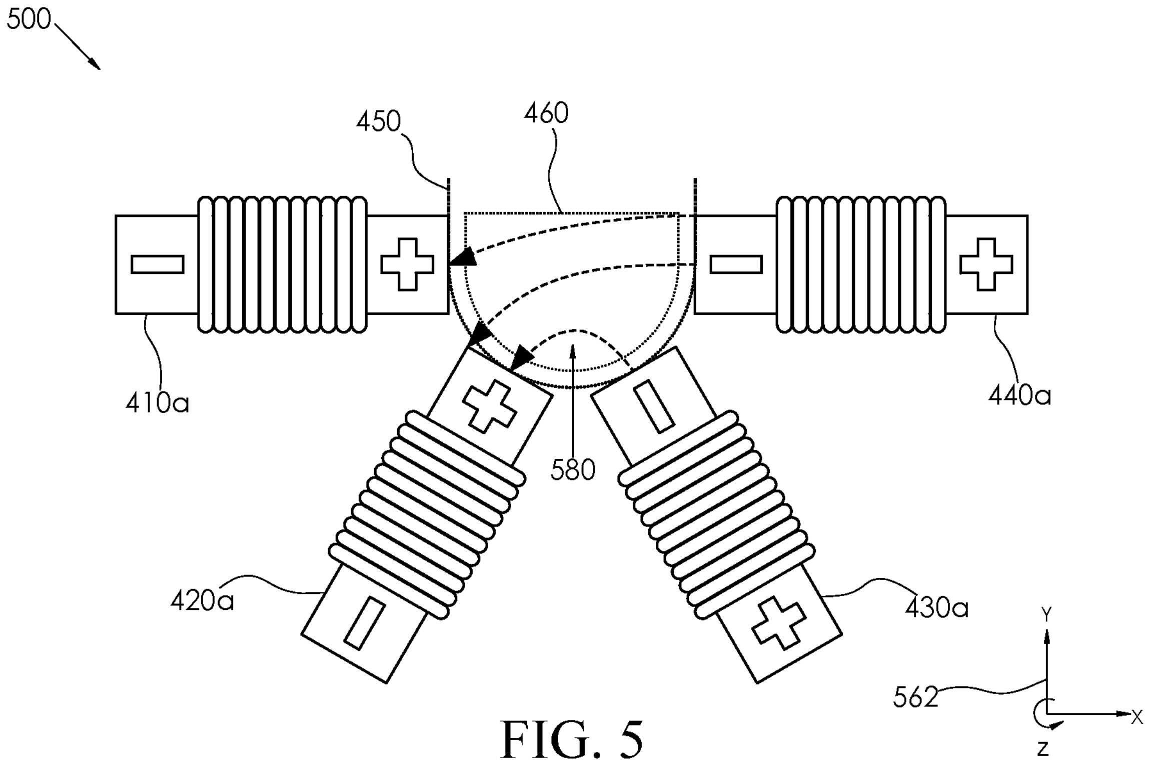
FIG. 5 is a diagram showing an embodiment of a flux former, illustrating the instantaneous magnetic flux in a right-to-left direction.
Figure 6:
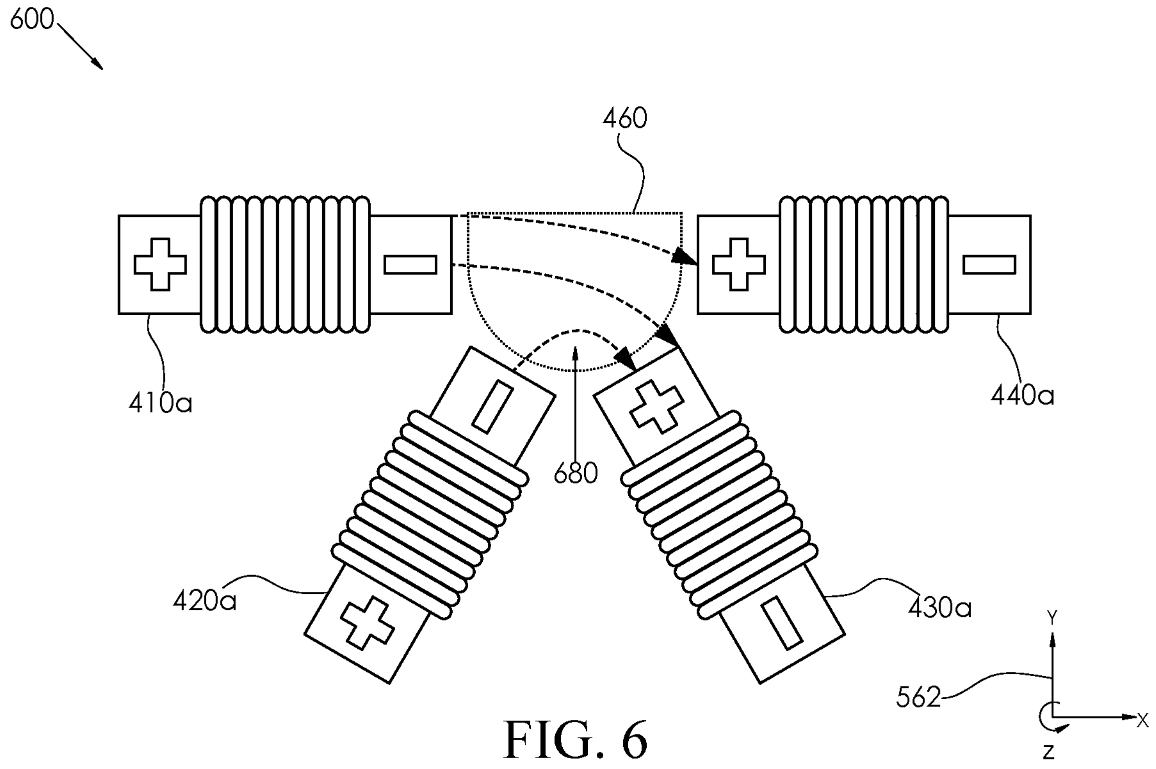
FIG. 6 is a diagram showing an embodiment of a flux former, illustrating the instantaneous magnetic flux in a left-to-right direction.

FIGS. 5 and 6 show flux formers 500 and 600, respectively, illustrating the instantaneous magnetic flux in a right-to-left direction and left-to-right direction, respectively. FIGS. 5 and 6 show a section of flux former 400 (see FIG. 4), but at different phases of an amplitude modulation process, to illustrate how a controller varies the current to four electromagnets 410*a*, 420*a*, 430*a*, and 440*a*. Varying the current arranges the poles and strengths of electromagnets to generate particular distributions of magnetic flux 580, 680, which have greatest density near the bottom of the working volume 460.

Three-dimensional Cartesian coordinate system 562 is used to describe channel 460, which is shown in cross-section in FIGS. 5 and 6, wherein "the bottom" is the least Y direction, according to the three-dimensional Cartesian coordinate axes 562, showing the Y and X axes and for which the Z axis is coming out of the page in FIGS. 5 and 6 and thus is not shown there. A cross section of the trough-shaped surface 450 is shown in FIG. 5, but not shown in FIG. 6.

Modulation of electromagnets 410*a*, 420*a*, 430*a*, 440*a* provide the greatest density of magnetic flux lines 580 and 680 as the magnetic field from the negative poles are attracted across the channel 460 to the positive poles on the other side.

The controller (not shown) is able to change the direction and path of the magnetic field lines 580, 680 by rapidly switching the currents to the electromagnets 410*a*, 420*a*, 430*a*, 440*a*. Alternating between the flux formers 500 and 600 generates a controlled changing of flux density in the channel 460 to induce currents in the conductive material of the target (not shown in FIGS. 5 and 6, for clarity) and thus impart force on the target. The imparted force is a component of the flux pocket, and represents a portion of the keeping force on the target wherein one function of the keeping force is to prevent the target (not shown) from approaching too closely the bottom portion (least Y-ward) of channel 460. In some embodiments, the negative Y-ward axis can be aligned to the downward direction in a gravity field (not shown) such as on the surface of a planet, in which case this keeping force is opposed to the gravitational attraction acting on the target (not shown in FIGS. 5 and 6).

Figure 7:
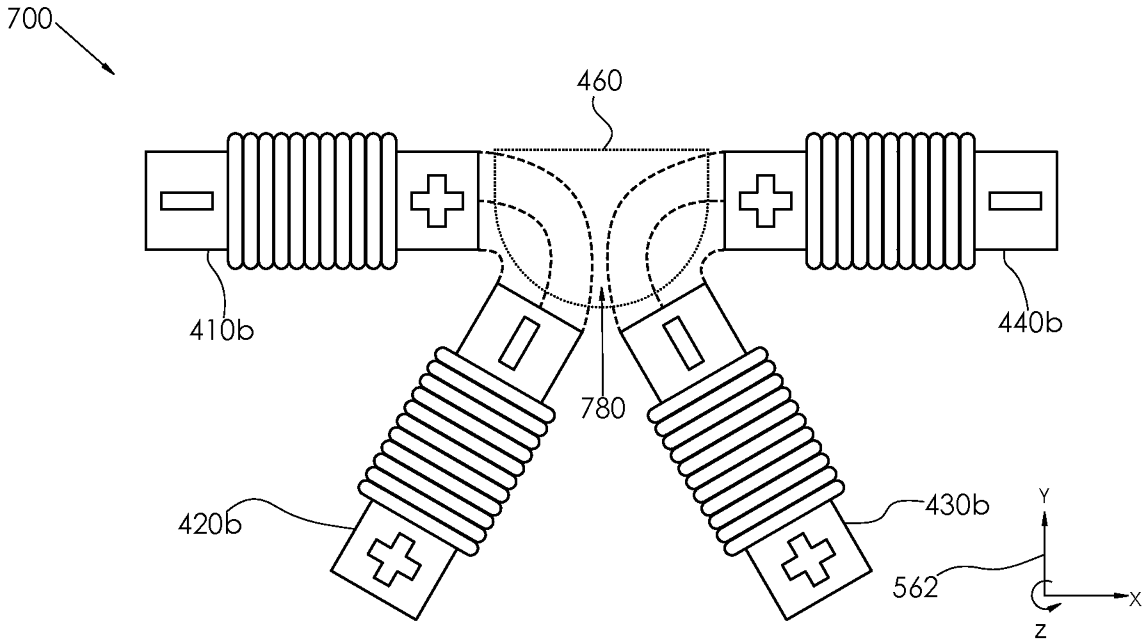
FIG. 7 is a diagram showing an embodiment of a flux former, illustrating instantaneous magnetic flux wherein two flux densities are formed between two pairs of electromagnets.

FIG. 7 shows flux former 700, illustrating instantaneous magnetic flux wherein two flux densities are formed between two pairs of electromagnets. Flux former 700 shows a different portion of flux former 400, and illustrates the controller (not shown) applying a different pattern of time-varying currents to produce a different distribution of magnetic flux in working volume 460 to exert a different set of forces on a target, again shown in cross section. Two regions of high flux density in a trough shape are created by changing the configuration of the poles so pole 420*b* is attracted to pole 410*b*, and pole 430*b* is attracted to 440*b*. This creates lifting force in the Y direction for levitation of the target, according to the three-dimensional Cartesian coordinate axes 462, keeping force in the X direction as well as limited control of the flux pocket in the X direction. Varying the current arranges the poles and strengths of electromagnets to generate particular distributions of magnetic flux 780.

When the controller combines these drives of the electromagnets in flux former 400, a stable flux pocket is generated and is able to hold a target, e.g., an aluminum ball, in place. The controller may adjust its amplitude modulation of the electromagnets to exert precise position control within channel 460 in any of the X, Y, and Z directions, thereby moving the flux pocket of stable equilibrium.

Figure 8:
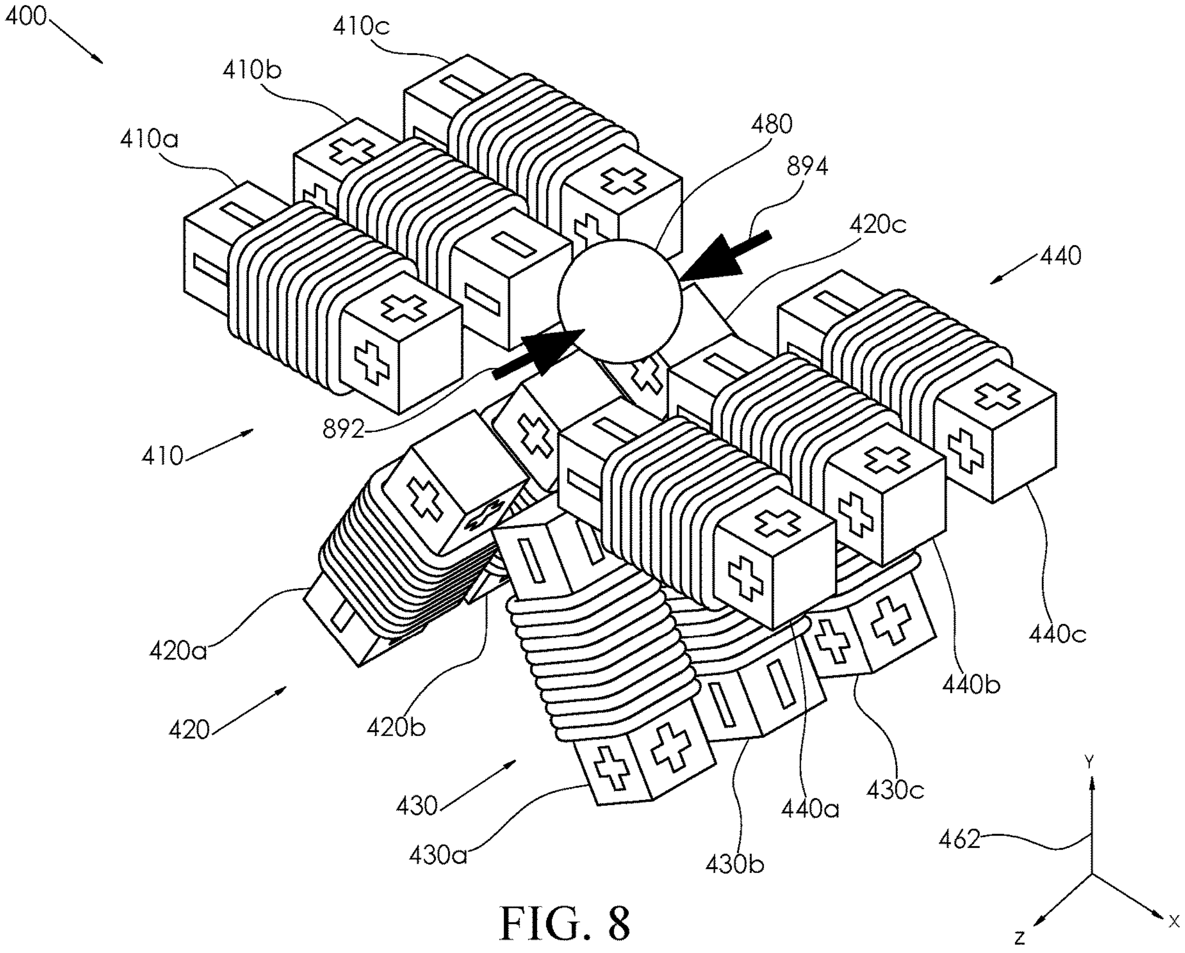
FIG. 8 is a diagram showing an embodiment of a flux former illustrating the effect of a controller applying a pattern of amplitude modulation generating keeping forces.

FIG. 8 shows flux former 400 illustrating the effect of a controller applying a pattern of amplitude modulation generating keeping forces. Flux former 400 illustrates the effect of the controller applying a pattern of amplitude modulation generating keeping forces. The flux former 400 is shown again in FIG. 8, in which the controller is driving the electromagnets using amplitude modulation. Electromagnets 410*a*, 420*a*, 430*a*, and 440*a* as well as 410*c*, 420*c*, 430*c*, and 440*c* generate flux densities which product keeping forces 892 and 894 acting on target 480. Electromagnets 410*b*, 420*b*, 430*b*, 440*c* generating lifting forces (not shown) to counteract the force of gravity in the Y direction and keeping forces in the X-axes.

When operating in microgravity conditions (i.e., wherein the target is not substantially affected by an external downward force in the direction of the negative Y-axis), two additional rows of three coils each (not shown) would mirror the bottom two rows 420 and 430. Trough-shaped working surface 450 may be replaced by a cylindrical surface (not shown) for which the angular axis may be closed. Channel 460 may be replaced by a more symmetric volume, e.g., a bounded cylindrical working volume, instead of the flat-topped working volume due to the increased symmetry of the conditions, i.e., zero or near-zero gravitational force in all directions and a radially symmetric surface.

Figure 9:
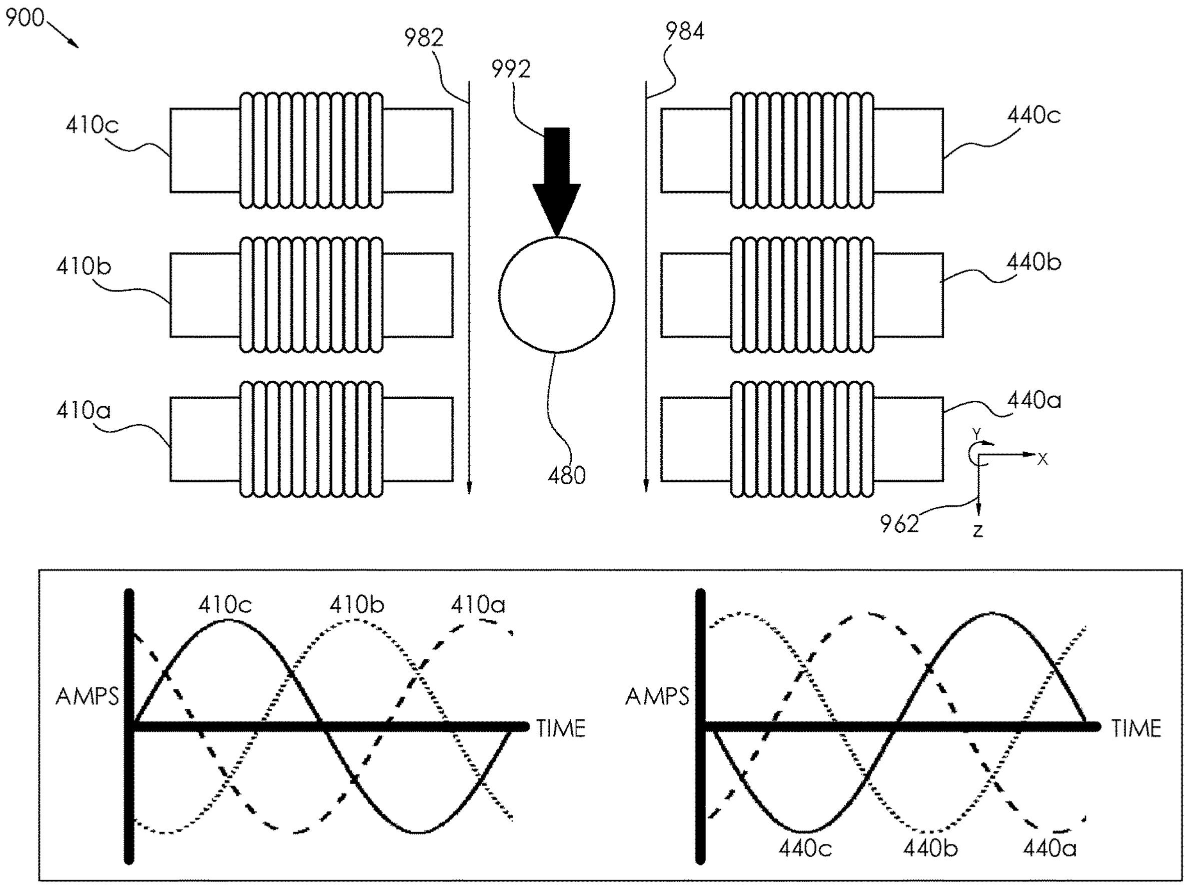
FIG. 9 is a diagram showing a top down view of an embodiment of a flux former, illustrating the effect of the controller applying a pattern of phase modulation to generate directional force on a target.

FIG. 9 shows a top down view flux former 900, illustrating the effect of the controller applying a pattern of phase modulation to generate directional force on a target. Flux former 900 illustrates the effect of the controller applying a pattern of phase modulation to generate directional and rotational force on the target. The controller may employ phase modulation to differently manipulate the target. In one example, shown in FIG. 9, electromagnets 410*a*, 410*b*, and 410*c*; and 440*a*, 440*b*, and 440, of flux former 900 are driven by the controller (not shown) using phase modulation. In this mode, the controller selects the drive for each consecutive electromagnet in a row (e.g., 410, 440) to be a current that is progressively 120 degrees out of phase relative to the electromagnet before it in the row. Together, as each coil successively reaches maximum power, one after the other, they create a spatially-moving wave of high flux density that moves across the target, causing a force in the direction of the phase modulation shown by arrows 982 and 984.

If the direction of the phase modulation is reversed, e.g., if the currents are instead selected by the controller to be −120 degrees out of phase, then the direction of force generated is reversed.

Figure 10:
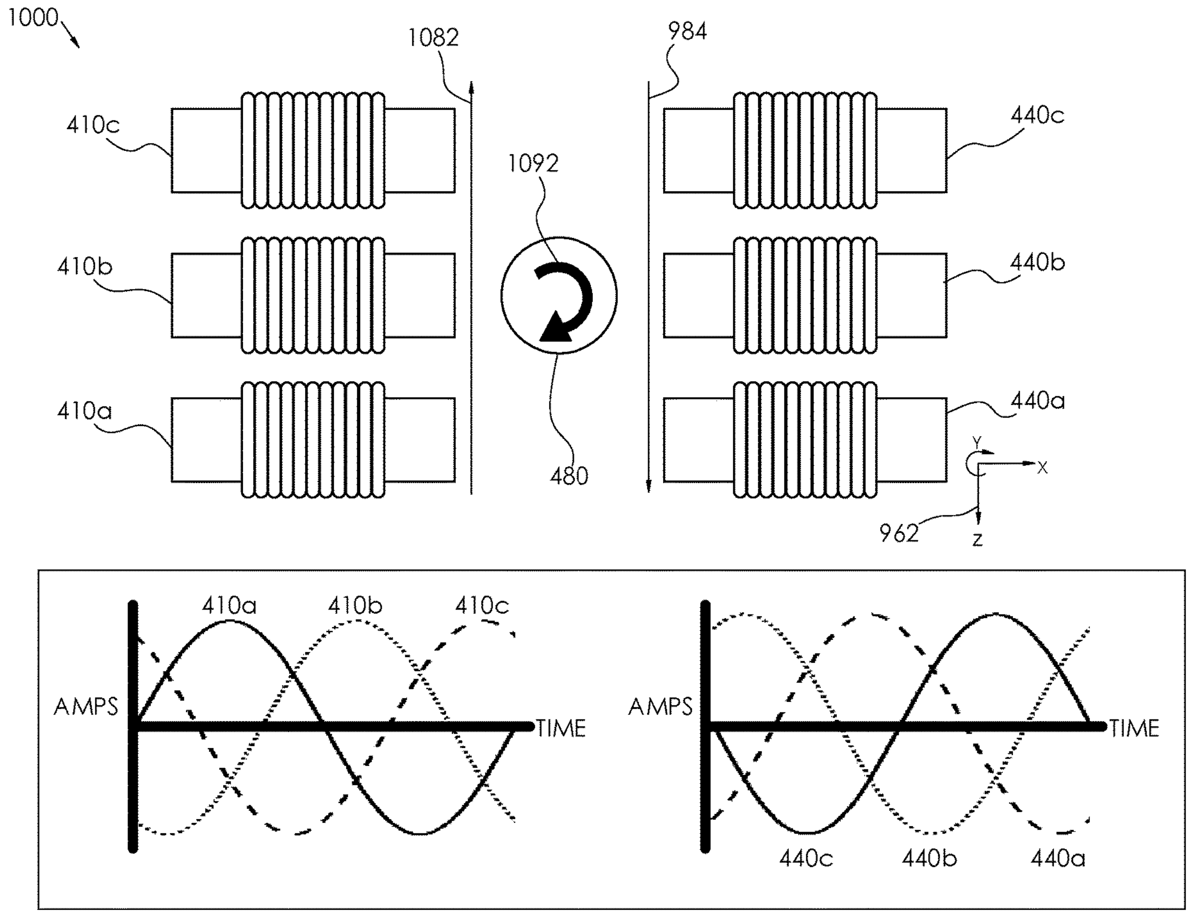
FIG. 10 is a diagram showing a top down view of an embodiment of a flux former, illustrating the effect of the controller applying a pattern of phase modulation to generate a rotational force on a target.

FIG. 10 shows a top down view of flux former 1000, illustrating the effect of the controller applying a pattern of phase modulation to generate a rotational force on a target. Flux former 1000 illustrates the effect of the controller applying a pattern of phase modulation to generate directional and rotational force on the target. FIG. 10 shows a configuration wherein the controller selects directions of phase modulation that are in opposition, shown by 1082 and 984. The phase modulation of row 410 is opposite to that in row 440. In this configuration, the flux dynamics cause a torque 1092 or force couple on the target material 480. The controller is able to control the rotational orientation of the target material about the Y-axis. Similarly, by using phase modulation with the electromagnet rows, it is possible to control rotation of the target 480 on the X-axis.

Figure 11:
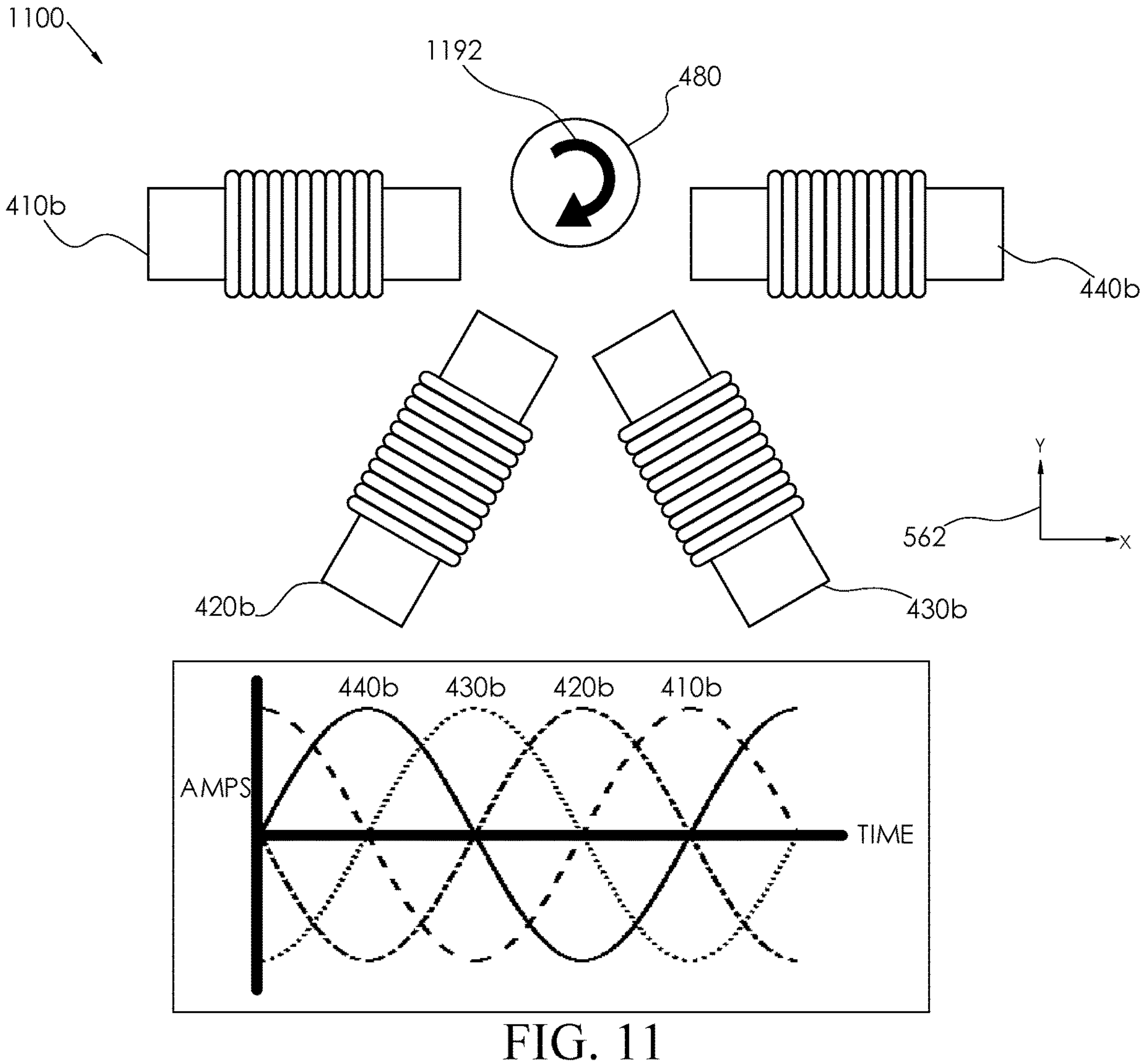
FIG. 11 is a diagram showing a side view of an embodiment of a flux former, illustrating the effect of the controller applying a pattern of phase modulation to generate a rotational force on a target.

FIG. 11 shows a side view of flux former 1100, illustrating the effect of the controller applying a pattern of phase modulation to generate a rotational force on a target. Flux former 1100 illustrates the effect of the controller applying a pattern of phase modulation to generating a rotational force on the target. In this configuration, the flux dynamics cause a torque 1192 or force couple on the target material 480. The controller may be configured to use phase modulation across many combinations of electromagnets (whether by row or arc, or other collections of magnets and phasing). For example, the controller may select to drive the four electromagnets 410*b*, 420*b*, 430*b*, and 440*b* with currents that are 90 degrees out of phase to each other, in order to rotate the target material about the Z-axis.

Figure 12:
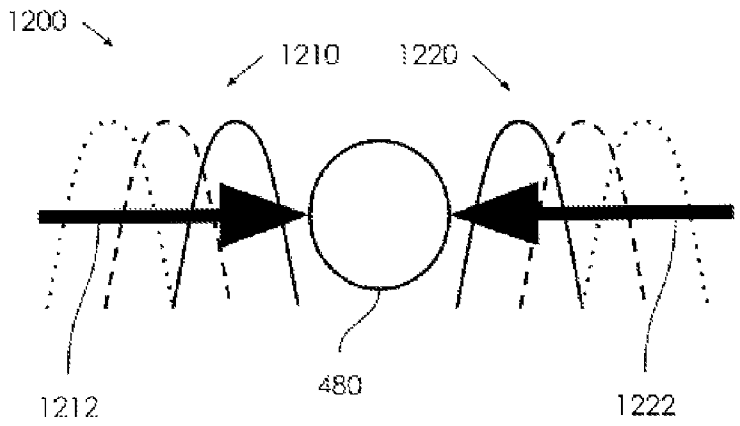
FIG. 12 is a diagram showing how phase modulation may be used to generate keeping forces.

FIG. 12 shows showing how phase modulation 1200 may be used to generate keeping forces. Phase modulation may be used as a keeping force, as shown in FIG. 12. With multiple electromagnets disposed to either end of an axis of a working volume, a controller can select an inward sweeping phase modulation. FIG. 12 shows the controller's drive of the current for three electromagnets on one side 1210 phased 120 degrees from each other and sweeping inward. Also shown are three coils on the other side 1220 phased 120 degrees from each other sweeping inward. The phasing of the coils will keep the target 480 in the center of the device by inducing forces 1212 and 1222 respectively.

Figure 13:
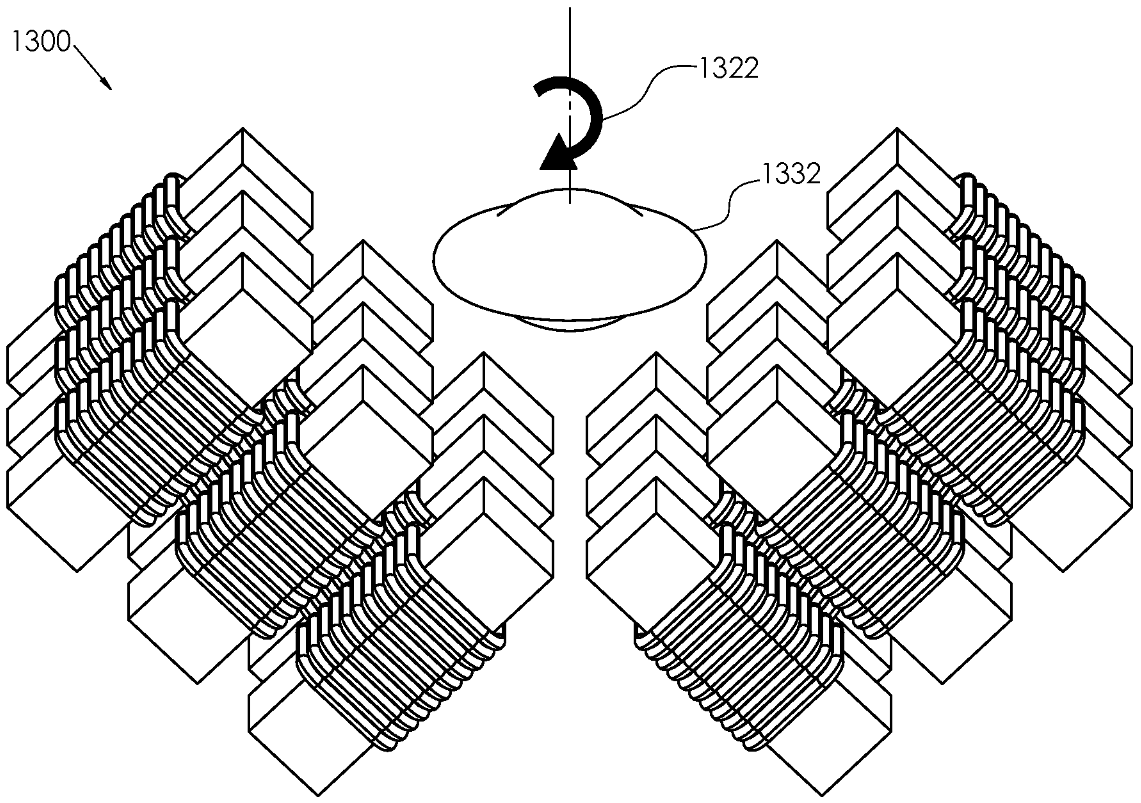
FIG. 13 is a diagram showing how phase modulation may be used to sort and purify the target material.

FIG. 13 shows how phase modulation may be used to sort and purify the target material. System 1300 comprises two arrays of electromagnets that form a working surface with triangular cross section where the controller selects an appropriate phase modulation so as to generate a rotational force 1322 to spin the target such that the resulting centripetal acceleration separates material by density as it the target material melts, shown as an oval profile 1332.

FIG. 13 shows material separation via temperature and centripetal sorting. Separating different material may be accomplished using centripetal acceleration. The target, which may comprise a plurality of conductive materials, may be heated to the highest melt temperature and spun to create one or more homogenous layers. The target may then be cooled to the lowest melt temperature and spun faster to physically separate the molten layer from the solid sphere in to a homogenous ring. Separation of the plurality of conductive materials can be accomplished using precise temperature control and centripetal acceleration. The plurality of conductive materials may be inductively heated to the highest material melting temperature. Without a gravitational field, the plurality of conductive materials will not separate, however, spinning the plurality of conductive materials with Lorentz forces creates a centrifugal force that separates the materials by density. If spun sufficiently fast, the plurality of conductive materials forms an oblate spheroid exposing each material layer. The plurality of conductive materials then cools to the lowest material melting temperature so there exists a dense solid ring around a molten core which can be separated out. The process is repeated to separate each layer. The separation process will preserve material alloying for typical aerospace materials. Oxidation (i.e. dross) is not a concern in vacuum and eddy current mixing ensures homogeneous distribution of alloying elements. Contaminants, such as paint, grease, and threadlocker, may gasify or become slag, but may still be purified centrifugally.

Figure 14:
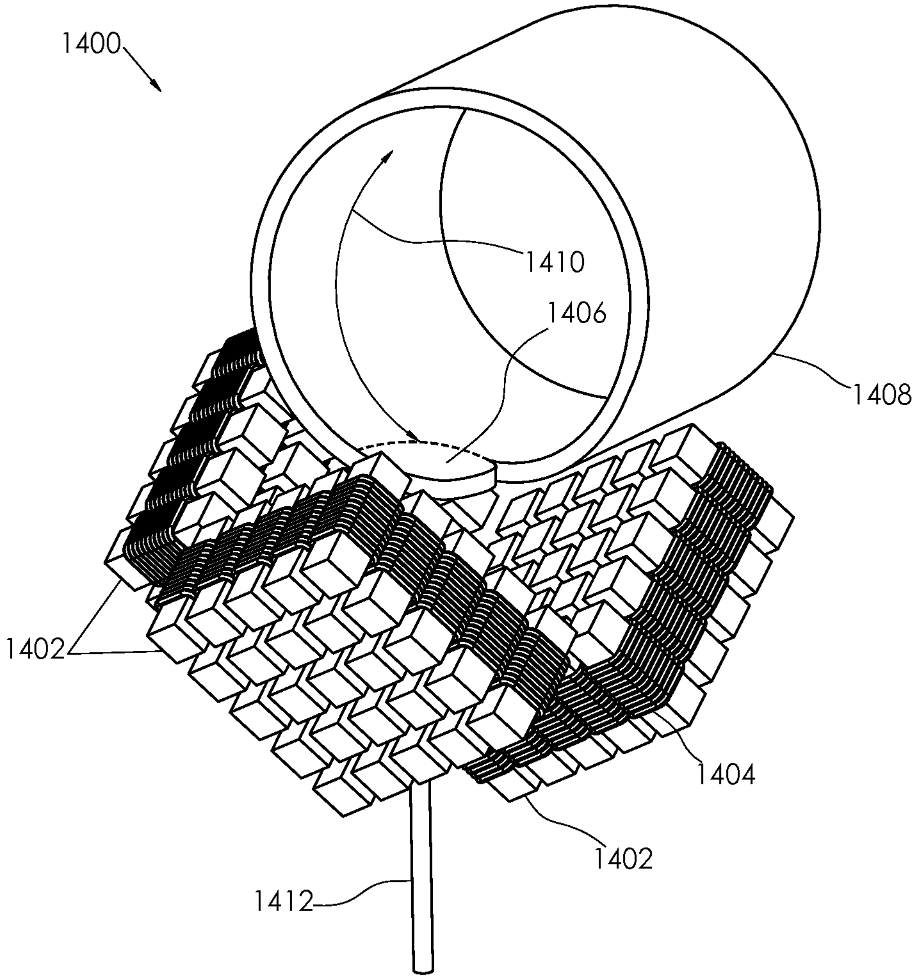
FIG. 14 is a diagram showing an embodiment of the system inductively manipulating molten metal without any physical contact, e.g., free-casting.

FIG. 14 shows inductive manipulation of molten metal without any physical contact, e.g., free-casting. System 1400 may free-cast an unlimited number of forms from feedstock and comprises electromagnetic array 1402. Electromagnetic array 1402 comprises a plurality of electromagnets 1404. Lorentz forces may push and pull section of target material 1406 to form a desired shape. In essence, this creates a reprogrammable electromagnetic mold. Target material 1408 is disposed in proximity to the working volume of electromagnetic array 1402 which heats and draws section of target material 1406 into the working volume of electromagnetic array 1402 via Lorentz forces. Section of target material 1406 may be heated and/or melted and separated from target material 1408. Section of target material 1406 is manipulated by electromagnetic array 1402 to form product 1412, which is ejected from system 1400. Alternatively, section of target material 1406 is manipulated while remaining attached to target material 1408. Target material 1408 is gradually drawn into the working volume of electromagnetic array 1402 along path 1410. The process may create basic shapes including, but not limited to, ingots, bars, rods, plates, sheets, filament wire, brackets, extrusions, shells, tanks, or a combination thereof. System 1400 has an infinite build volume in microgravity environments may incrementally add sections of material 1406 to the large workpieces while maintaining hold of cooled sections with Lorentz forces. Parts produced by system 1400 will have rounded edges and may require post processing (machining, grinding, tapping, etc.) for higher precision as needed. Production speed may be comparable to traditional casting and may have significantly faster additive manufacturing than traditional methods.

Figure 15:
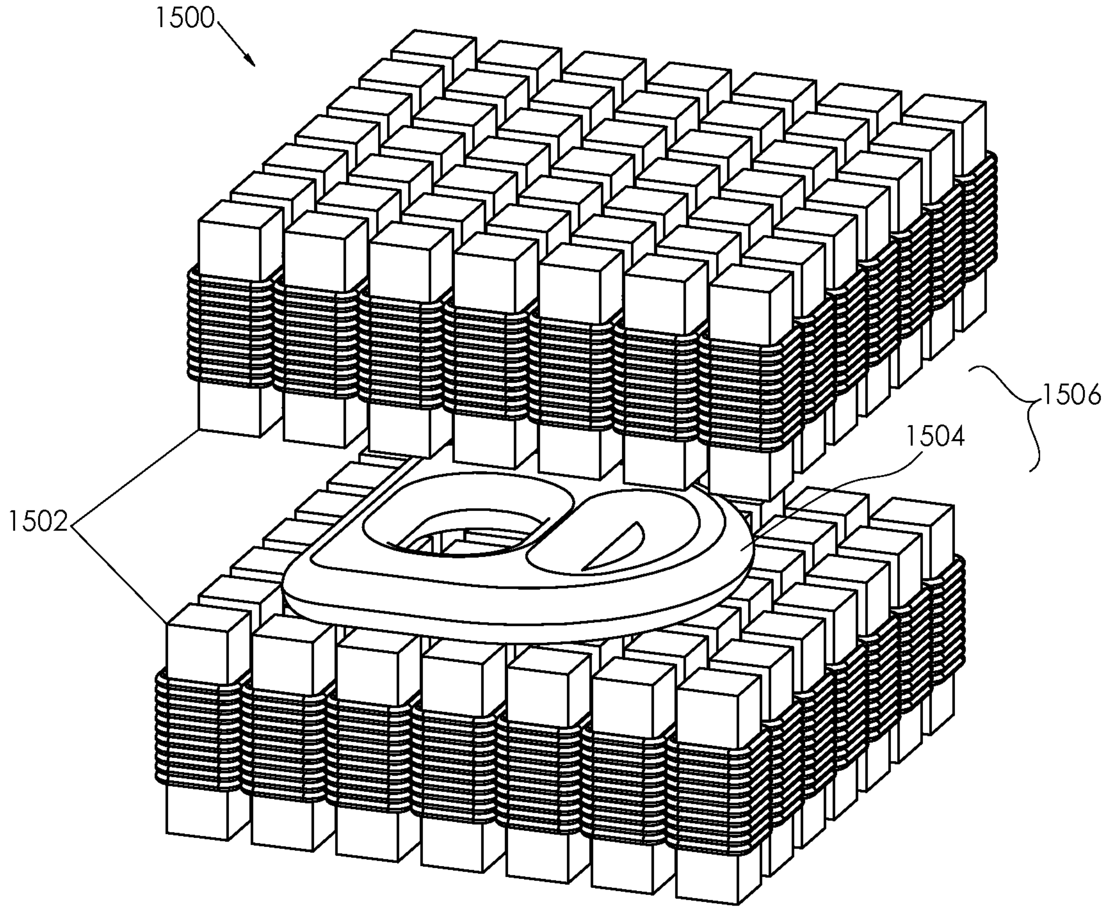
FIG. 15 is a diagram showing an embodiment of the system free-casting a target material.

FIG. 15 shows an embodiment of the system free-casting a target material. System 1500 comprises electromagnetic arrays 1502. Target material 1504 is disposed between electromagnetic arrays 1502 and within working volume 1506.

Figure 16A:
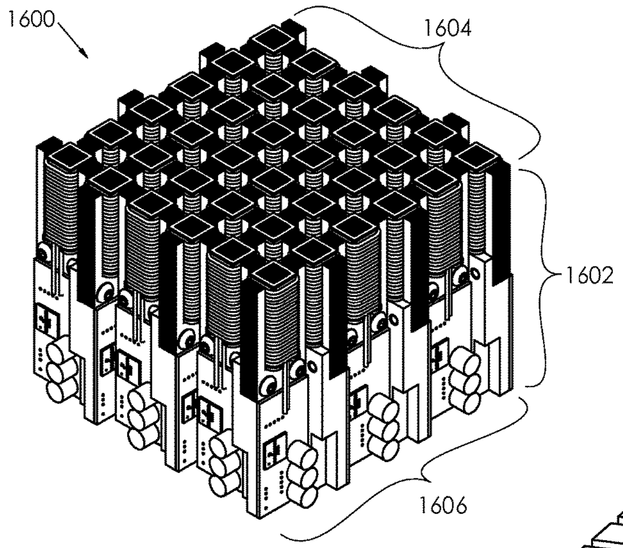
FIGS. 16A and 16B are diagrams showing an embodiment of an electromagnet array with associated controllers, and an electromagnet array, respectively.
Figure 16B:
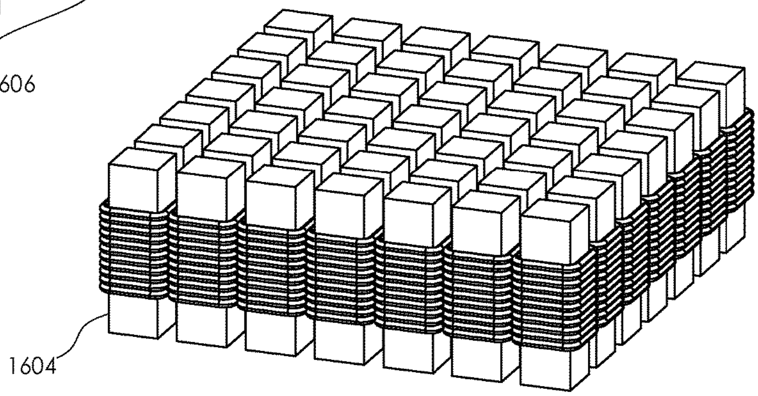

FIGS. 16A and 16B show an embodiment of an electromagnet array with associated controllers, and an electromagnet array, respectively. System 1600 comprises controlled electromagnet array 1602 comprising electromagnet array 1604 and controller array 1606. Electromagnet array 1604 and controller array 1606 comprise a plurality of electromagnets and controllers, respectively.

Figure 17A:
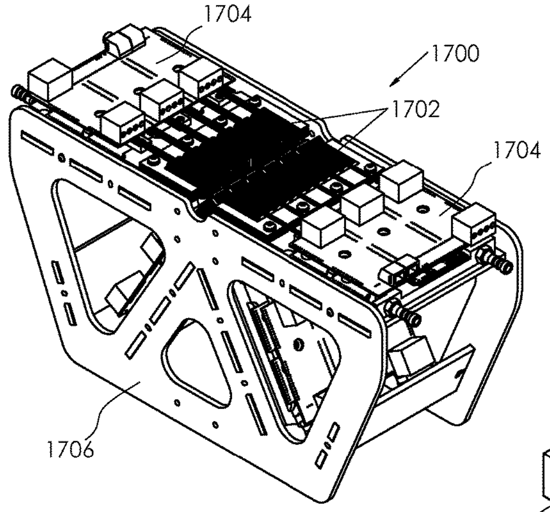
FIGS. 17A and 17B are diagrams showing an embodiment of the system of the present invention comprising 24 independently-controlled electromagnet coils, and an array of 24 independently-controlled electromagnet coils, respectively.
Figure 17B:
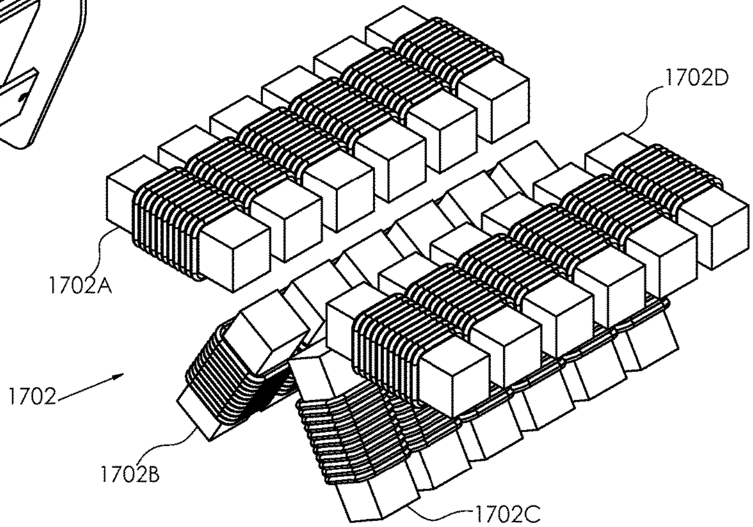

FIGS. 17A and 17B shows an embodiment of the system of the present invention comprising 24 independently-controlled electromagnet coils, and an array of 24 independently-controlled electromagnet coils, respectively. System 1700 comprises electromagnet array 1702 comprising and an array of 24 independently-controlled electromagnet coils. The 24 independently-controlled electromagnet coils are disposed according to electromagnet tors 1702A, 1702B, 1702C, and 1702D. System 1700 further comprises controllers 1704 in communication with electromagnet array 1702. Electromagnet array 1702 and controllers 1704 are disposed within housing 1706.

Figure 18:
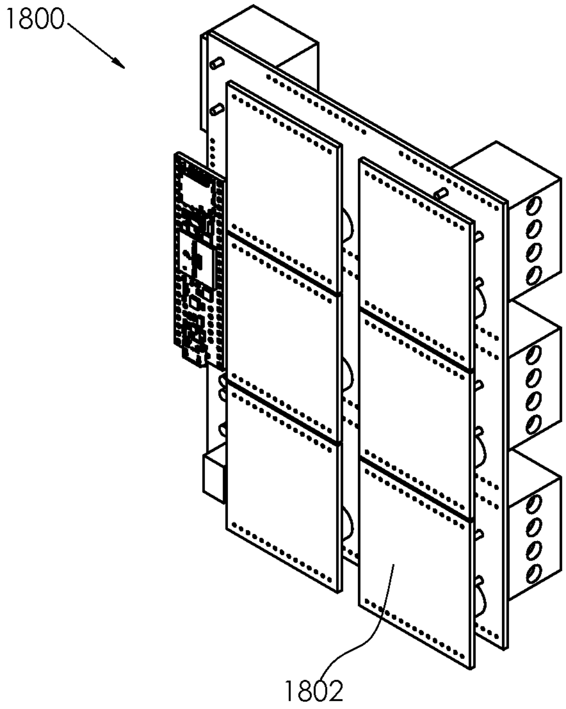
FIG. 18 is a diagram showing an embodiment of a module electronics assembly.

FIG. 18 shows module electronics assembly 1800 comprising amplifier board 1802. Module electronics assembly 1800 comprises a plurality of amplifier board 1802, each of which may deliver 840 W of power.

Figure 19:
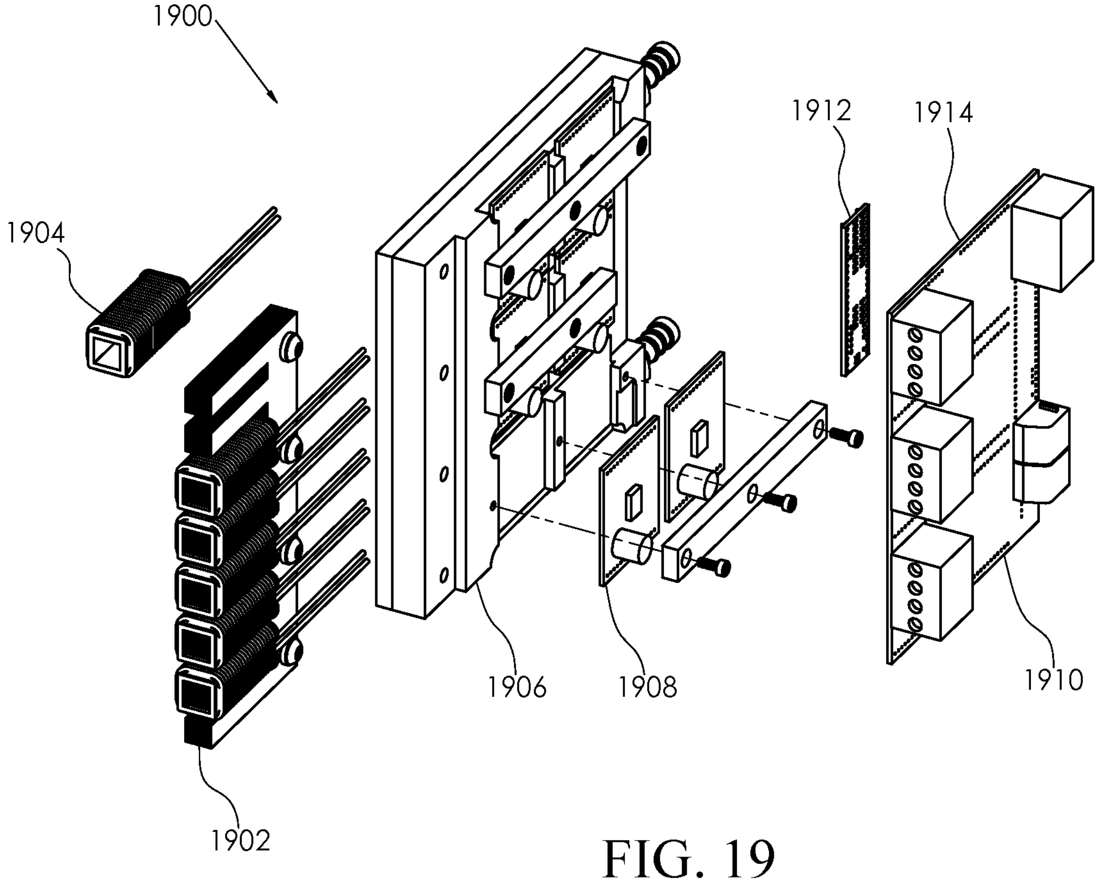
FIG. 19 is a diagram showing an embodiment of a cold plate model for the system of the present invention.

FIG. 19 and show cold plate model 1900 comprising electromagnet array 1902, controller plate 1906, processor 1912, and amplifier plate 1910. Electromagnet array 1902 comprises a plurality of electromagnet coil 1904. Controller plate 1906 comprises a plurality of microcontrollers 1908. Amplifier plate 1910 comprises a plurality of amplifier boards 1914.

Figure 20:
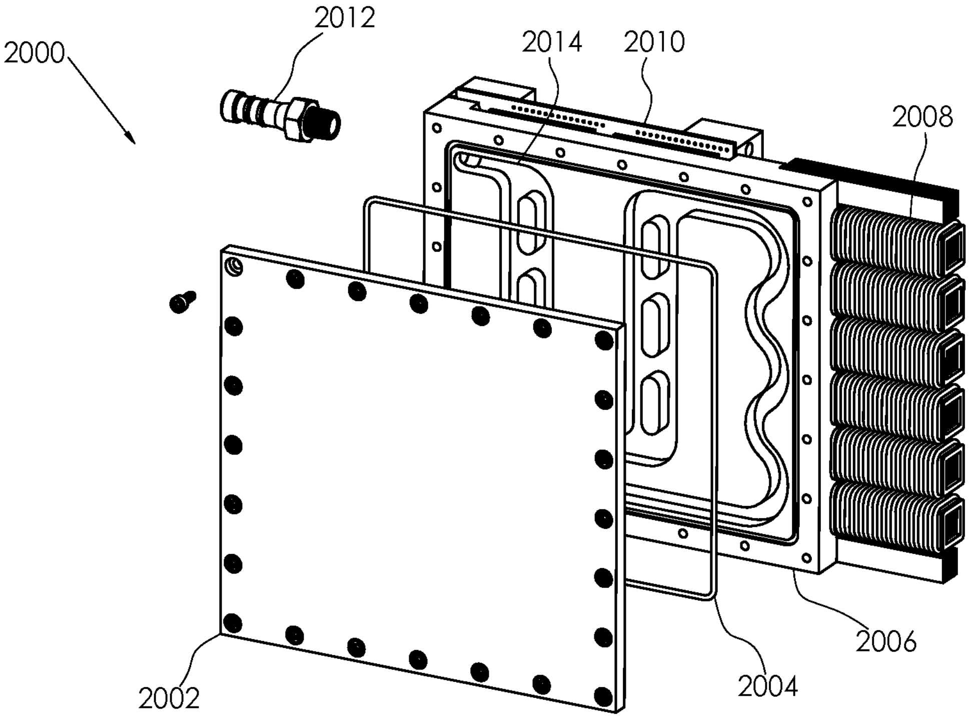
FIG. 20 is a diagram showing an embodiment of a cold plate model for the system of the present invention comprising cooling channels.
Figure 21A:
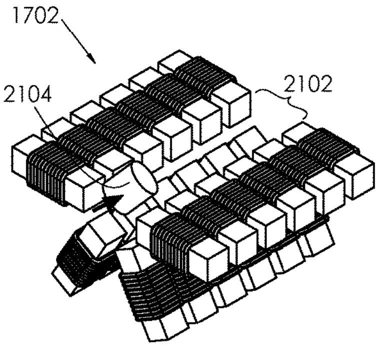
FIGS. 21A, 21B, 21C, 21D, 21E, 21F are diagrams showing an embodiment of a flux former wherein a target material is traversing through a channel of the flux former.
Figure 21B:
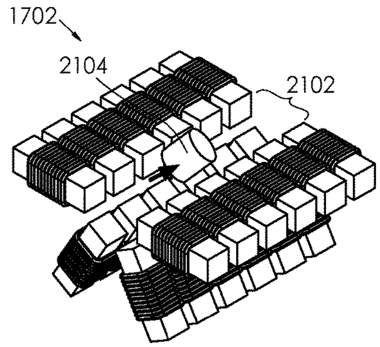
Figure 21C:
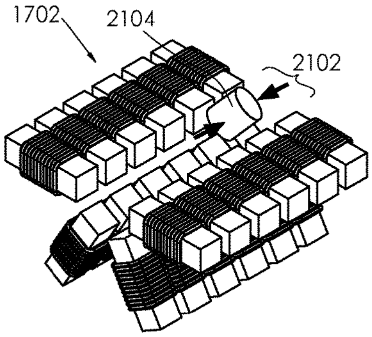
Figure 21D:
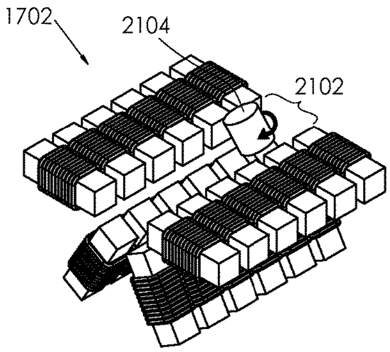
Figure 21E:
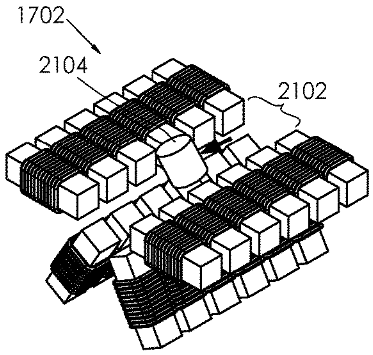
Figure 21F:
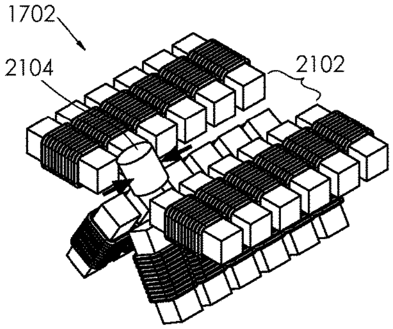

FIG. 20 shows cold plate model 2000 comprising bottom plate 2002, seal 2004, top plate 2006, electromagnet array 2008, amplifier plate 2010, fluid port 2012, and channel 2014. Cooling fluid enters fluid port 2012 and passes through channel 2014 to cool amplifier 2010 and electromagnet array 2008.

FIGS. 21A, 21B, 21C, 21D, 21E, and 21F show flux former 1702 comprising channel 2102. Target material 2104 is manipulated by flux former 1702 to position it at any point along and/or within channel 2102 of flux former 1702.

Figure 22:
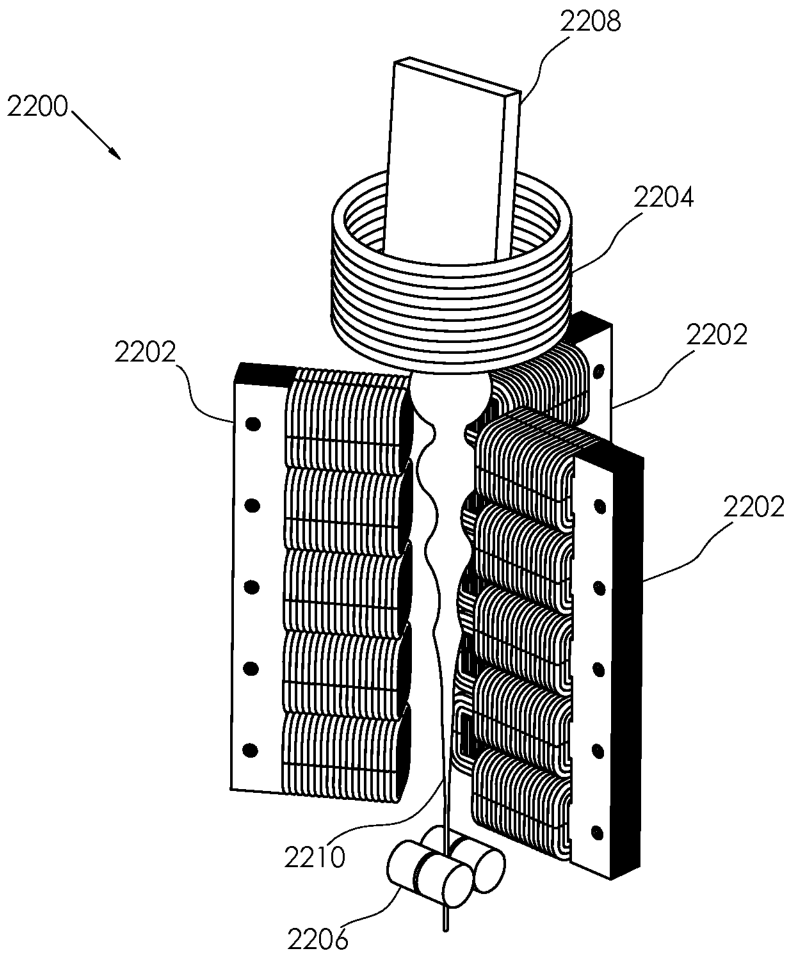
FIG. 22 is a diagram showing an embodiment of a flux former wherein a target material is being extruded as it passes through the flux former.

FIG. 22 shows flux former 2200 comprising electromagnet array 2202, induction heat ring 2204, and compression roller 2206. Unformed target material 2208 passes through induction heat ring 2204, which causes unformed target material 2208 to melt and become extrudable target material 2210. Extrudable target material 2210 is manipulated, e.g., extruded by electromagnet array 2202 as it passes through flux former 2200. Extrudable target material 2210 is then formed by compression roller 2206 into a wire shape.

The target material, e.g., conductive materials, are repelled from a region of high-density flux and motivated to travel from a higher flux density to a lower flux density. The system may create a stable, three-dimensional volume where conductive material will be held without need for mechanical contact, i.e., without touching the target, by using a plurality of programmatically controlled electromagnets generating higher flux density surrounding a pocket of lower flux density. The shape and position of this flux pocket, which forms the working volume, may be programmatically controlled in three-dimensional space.

Flux pockets may be created with or without feedback from sensors. In the field of control system engineering, systems without feedback sensors are termed "open loop" and with feedback sensors are termed "closed loop". Closed loop systems may be more precise and robust.

The system may recycle or process materials of varying shape and composition using a plurality of programmably controlled electromagnets to form stable electromagnetic equilibria by dynamically changing the magnetic flux density based on sensor feedback of the target material to transport, hold, heat, melt, and form these materials. The system may also operate without the need for contact and without the need for moving parts.

In mathematics, a surface is a two-dimensional manifold, which means that it resembles a two-dimensional Euclidean space near each point. Locally, that gives a surface two opposed faces, having opposite normals at each point in the region. For surfaces of interest here, these opposed faces cover the full extent of the surface.

A surface can have zero or more edges. One example of a surface is the entirety of a two-dimensional sphere, has no edge, and is continuous everywhere. A surface may have a single edge, such as a surface that is a circular region of a planar surface, and is bounded by a circular edge; or a surface that is one portion of a two-dimensional sphere after the sphere is divided by a plane, e.g., a two-dimensional hemisphere comprising no points having positive azimuth, the edge of which is the circle that is the intersection of the sphere with the plane. A surface may be a portion of an infinite two-dimensional cylinder bounded (sliced) at two different positions along the longitudinal axis has two edges, one at each end. A cylindrical surface bounding a finite solid cylinder may have no edges, as the ends of the solid cylinder can be capped by planar portions of the bounding surface. A surface may have an arbitrary number of holes, each hole bounded by an edge, and thus, a surface can have an arbitrary number of edges.

The system may comprise one or more electromagnets disposed to each have at least a first pole meeting a working surface comprising a first and a second face. The electromagnets may be disposed at the first face (the "magnet side") of the working surface, with each of the electromagnets having the first pole directed through and/or at the surface. The opposite second face of the working surface is the "working side" of the surface. On the working side, the surface represents a maximum bound of an allowable working volume. The electromagnet may comprise two poles and each pole may have a negative or positive charge.

The system may comprise a flux former, comprising one or more electromagnets and/or electromagnet coils configured to generate an electromagnetic flux. The electromagnetic flux may have defined dimensions.

The system may comprise a controller that may select the frequency of the current driving one or more of the electromagnets. The controller may be a modulating controller. The frequency modulation may increase or decrease the amount of heat being induced in the target material while not significantly changing the force applied by the magnetic field. The frequency of the time-varying current input may be increased while the amplitude is decreased to increase heat while maintaining constant force. The value of frequency modulation is the ability to control the target material with an adequate amount of force, while allowing the target material to transition from liquid to solid while retaining a prescribed shape.

The system may further comprise a sensor in communication with the controller. The sensor may be configured to provide information regarding the position of a target. The controller may receive feedback from the sensor and operate a closed control loop to better control position, velocity, and acceleration of the target.

The target material may be solid, and the controller may drive the electromagnets to heat the conductive material of the target and/or target material. Heating may cause some or all of the materials of the target to melt. At least a portion of the material of the target may be provided in liquid form and the target may cool to the point that some or all of the liquid materials solidify.

The target material may be melted to become liquid metal and the controller may select phase modulation to generate forces on the liquid metal. The controller may collect the liquid metal in a reservoir and draw off the liquid material to flow into a desired shape generated by a programmatically defined flux density and phase modulation. If the material is allowed to cool and solidify, the target can retain this shape.

Modulation of the electromagnets may act differently on a solid target, a liquid target, and a semi-solid/semi-liquid target. Solid and liquid metals may react differently with respect to flux density. Target materials of differing conductivity may react differently, and these differences may be used to manipulate the target material including but not limited to, by separating or mixing the target material.

The change in behavior between solid and liquid metal may be advantageously used for sorting or drawing materials with dissimilar melting temperatures. The target material may also be aggressively mixed particularly as the mixture is solidifying. Aggressive mixing occurs when the system applies an amplitudal modulation on a liquid metal target material. The keeping forces of amplitudal modulation may generate reduced repulsive forces in metals after melting because the target material will internally mix. However, the reduced repulsive force in combination with phase modulation generates a force as great as the normal repulsive force.

A number of factors may affect aggressive mixing. For example, the penetration depth of the magnetic flux into a material, which is based on frequency, may affect aggressive mixing. As a target material solidifies in zero gravity the frequency of the sin wave is increased to reduce the penetration depth. The reduction in penetration depth allows a force to be applied to the liquid metal without heating it as much compared to not increasing the frequency of the sin wave. Another factor is closed loop control where the target is contacted with magnetic flux when it leaves the desired shape in order to push it back into place. These factors contribute to generating keeping forces while not adding heat to the liquid metal, which is quickly cooling from radiative thermal losses until it solidifies in the desired shape.

The system may be used to address different material properties and environments. For example, in microgravity environments or at small scales, the target material surface tension may be a significant force component. Modulation of the electromagnets can be adapted for these changes.

Different forces and heat may be induced on a target by the controller. The controller may select one or more patterns of time-varying currents. Different pattern of currents may be imposed by time-domain multiplexing, wherein a first pattern is selected and applied by the controller for a first interval, then a second pattern is selected and apply by the controller for a subsequent interval, with the interleaving of the patterns occurring at a rate sufficient to achieve the desired manipulation of the target. The principle of superposition may be used, wherein the controller sums the currents from the first and second patterns and with the superposition of forces being induced on the target being likewise summed, provided that current and magnetic saturation limits are not exceeded. These combined patterns may induce a combination of forces, torques, and or heat in the target material.

The target material may be programmatically flattened, stretched, drawn, or formed while being kept within the working volume. The heat may be programmatically controlling to allow solidification of the target while still exerting keeping and shaping forces.

A conductive material may be delivered to the system and the system may actively ingest the conductive material to become a target by the controller selecting specific current modulations to draw the material into the working volume once the material is at least partially disposed within working volume. The electromagnetic of the system may apply a force to eject the target material from the working volume of a system.

The system may be a plurality of systems arranged in series or in parallel. In systems arranged in series, the controller may select current modulations appropriate to moving a target out of the working volume to eject the target from a first system. The ejected target may be delivered to a second system, and a target exiting a working volume of the first system may be a target material incoming to the working volume of the second system.

The system may comprise a sensor. The sensor may be in communication with a controller and/or modulating controller. The sensor may be configured to provide information and/or send a signal to the controller and/or modulating controller. The information and/or signal may relate to characteristic of a target material including, but not limited to, the shape, temperature, position, rotation, velocity, composition, or a combination thereof. The controller and/or modulating controller may control a flux that transports, holds, heats, melts, and/or form a target material after receiving and/or in response to the information and/or signal received from the sensor.

The system may comprise and/or operate at a defined wattage. The wattage may be at least about 6 W, about 6 W to about 1 MW, about 50 W to about 0.75 MW, about 100 W to about 0.5 MW, about 500 W to about 0.25 MW, about 1 KW to about 200 KW, about 50 KW to about 150 KW, or about 1 MW.

Embodiments of the present invention provide a technology-based solution that overcomes existing problems with the current state of the art in a technical way to satisfy an existing problem for contactless and/or microgravity metal formation. Embodiments of the present invention achieve important benefits over the current state of the art, such as contactless metal forming, metal manipulation in microgravity environments, and precision metalworking. Some of the unconventional steps of embodiments of the present invention include one or more electromagnets generating a magnetic flux to manipulate conductive metal.

INDUSTRIAL APPLICABILITY

The invention is further illustrated by the following non-limiting examples.

Example 1

Melted gallium was manipulated in a system, e.g., the inductive foundry, of the present invention. Melted gallium was used an as an analog for aluminum. Both gallium and aluminum are non-ferrous, with aluminum having higher electrical and thermal conductivity, and lower density (all advantageous for this process) but a higher melting temperature than gallium.

Melted gallium was disposed into a trough. Without the effect of gravity, the material would float free, and its movement would be more apparent. For a terrestrial demonstration, the effects were more subtle but could be seen by comparing the liquid metal to the top edge of a crucible containing the melted gallium.

The melted gallium was collected in the center of the trough. The inductive foundry phased the coils to create forces that pushed the gallium to the center of the trough. In space, melted scrap would need to be collected and contained, ideally without contact to avoid material contamination, heat transfer, and contamination buildup on the equipment. Induced torques caused the metal to rotate, which may be used later for refinement or other purposes.

The melted gallium was moved to the right, back to center, and to the left. This sequence demonstrated stable, intentional control of the metal for handling, continuous flow, or moldless-casting. Control was accomplished without a feedback sensor for simplicity (i.e. open loop) or with a feedback sensor (e.g., LIDAR) for greater accuracy.

The melted gallium was divided in two portions. Once the inductive foundry melted the scrap, it naturally collected into a single unit due to surface tension or electromagnetic forces. The inductive foundry processes controlled the melted gallium's physical shape. The inductive foundry was able to split a single blob of material and dispense a finite amount without touching it.

The preceding example can be repeated with similar success by substituting the generically or specifically described reactants and/or operating conditions of this invention for those used in the preceding examples.

Note that in the specification and claims, "about" or "approximately" means within twenty percent (20%) of the numerical amount cited.

Although the invention has been described in detail with particular reference to these embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A system for manipulating or heating conductive material, said system comprising:
- an electromagnet array;
- said electromagnet array comprising:
  - a working volume;
  - a first electromagnet;
  - a second electromagnet;
    - said first electromagnet and said second electromagnet each comprising:
    - a body;
    - a first pole, said first pole proximal to a working surface;
    - a second pole, said second pole distal to a working surface;
    - a coil at least partially disposed around said body;

a modulating controller configured to selectively apply a current to said first or said second electromagnet;
said current configured to produce a time-varying flux density at said first pole;
said electromagnetic array configured to draw at least a section of said conductive material through said working volume;
said electromagnetic array configured to manipulate at least a section of said conductive material to form an object, which is ejected from said system; and
said working volume in communication with said first pole.

2. The system of claim 1 further comprising a third electromagnet at least partially disposed beside a first face of said first or said second electromagnet.

3. The system of claim 1 further comprising a fourth electromagnet at least partially disposed beside a second face of said first or said second electromagnet.

4. The system of claim 1 further comprising a fifth electromagnet at least partially disposed beside a third face of said first or said second electromagnet.

5. The system of claim 1 further comprising a sixth electromagnet at least partially disposed beside a fourth face of said first or said second electromagnet.

6. The system of claim 1 further comprising a first plurality of electromagnets arranged in parallel.

7. The system of claim 1 wherein said working surface is planar.

8. The system of claim 1 wherein said flux density is configured to dispose a target at least partially within said working volume.

9. The system of claim 1 wherein said flux density is affected by said first electromagnet and said second electromagnet.

10. The system of claim 1 wherein said flux density is at least partially disposed between said first electromagnet and said second electromagnet.

11. The system of claim 1 further comprising a sensor in communication with said modulating controller.

* * * * *